(12) United States Patent
Liu et al.

(10) Patent No.: US 12,143,433 B2
(45) Date of Patent: Nov. 12, 2024

(54) VIDEO TRANSMISSION METHOD, DEVICE, AND SYSTEM, AND STORAGE MEDIUM

(71) Applicant: HUAWEI TECHNOLOGIES CO., LTD., Guangdong (CN)

(72) Inventors: Yan Liu, Shenzhen (CN); Jinzhou Ye, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/150,980

(22) Filed: Jan. 6, 2023

(65) Prior Publication Data

US 2023/0156065 A1    May 18, 2023

Related U.S. Application Data

(63) Continuation of application No. PCT/CN2021/101072, filed on Jun. 18, 2021.

(30) Foreign Application Priority Data

Jul. 10, 2020    (CN) .......................... 202010664424.3

(51) Int. Cl.
     *H04L 65/65*      (2022.01)
     *H04L 65/1069*      (2022.01)
     (Continued)

(52) U.S. Cl.
     CPC ........ *H04L 65/765* (2022.05); *H04L 65/1069* (2013.01); *H04L 65/65* (2022.05); *H04L 65/1104* (2022.05)

(58) Field of Classification Search
     CPC ... H04L 65/765; H04L 65/65; H04L 65/1069; H04L 65/1104

(Continued)

(56) References Cited

U.S. PATENT DOCUMENTS

| | | | | |
|---|---|---|---|---|
| 11,252,716 | B2 * | 2/2022 | Nammi | ................. H04W 24/08 |
| 2008/0137541 | A1 * | 6/2008 | Agarwal | ................. H04L 45/38 |
| | | | | 370/241 |

(Continued)

FOREIGN PATENT DOCUMENTS

| | | | | |
|---|---|---|---|---|
| CN | 103118238 | A | 5/2013 | |
| EP | 2175607 | A1 * | 4/2010 | ......... H04L 65/1006 |

OTHER PUBLICATIONS

H. Schulzrinne et al., "RTP: A Transport Protocol for Real-Time Applications", Request for Comments: 3550, Network Working Group, Jul. 2003, total 104 pages.

(Continued)

*Primary Examiner* — Adnan M Mirza

(57) ABSTRACT

A video transmission method includes: A first media gateway receives an uplink media packet sent by a first terminal, where the uplink media packet carries information indicating that the first terminal supports an uplink-downlink resolution asymmetry capability and an uplink media stream of a first resolution of the first terminal. The first media gateway sends a first downlink media packet to the first terminal, where the first downlink media packet carries a downlink media stream of a second resolution of the first terminal, and the first resolution is different from the second resolution. The solution is applicable to the following example case: In a video call process, a terminal that supports different resolutions in a sending direction and a receiving direction can lower a resolution based on channel quality to deliver a video packet, and can raise the resolution when network resources are sufficient.

20 Claims, 12 Drawing Sheets

(51) Int. Cl.
  *H04L 65/75* (2022.01)
  *H04L 65/1104* (2022.01)
(58) Field of Classification Search
  USPC .......................................................... 709/217
  See application file for complete search history.

(56) References Cited

U.S. PATENT DOCUMENTS

| | | | | |
|---|---|---|---|---|
| 2009/0116458 | A1* | 5/2009 | Ramesh | H04L 65/765 |
| | | | | 370/336 |
| 2015/0163277 | A1* | 6/2015 | Albal | H04N 21/6137 |
| | | | | 725/62 |
| 2015/0350604 | A1* | 12/2015 | Roy | H04N 7/155 |
| | | | | 348/14.09 |
| 2018/0092086 | A1* | 3/2018 | Nammi | H04L 27/26025 |
| 2020/0329088 | A1* | 10/2020 | Oyman | H04L 65/1016 |

OTHER PUBLICATIONS

D. Ceccarelli et al., "Generalized SCSI: A Generic Structure for Interface Switching Capability Descriptor (ISCD) Switching Capability Specific Information (SCSI)", Request for Comments: 8258, Internet Engineering Task Force (IETF), Oct. 2017, total 7 pages.
International Search Report and Written Opinion issued in PCT/CN2021/101072, dated Sep. 23, 2021, 10 pages.
Extended European Search Report issued in EP21838566.4, dated Nov. 23, 2023, 8 pages.

* cited by examiner

VIDEO TRANSMISSION METHOD, DEVICE, AND SYSTEM, AND STORAGE MEDIUM

CROSS-REFERENCE TO RELATED APPLICATIONS

This application is a continuation of International Application n No. PCT/CN2021/101072, filed on Jun. 18, 2021, which claims priority to Chinese Patent Application No. 202010664424.3, filed on Jul. 10, 2020. The disclosures of the aforementioned applications are hereby incorporated by reference in their entireties.

TECHNICAL FIELD

The present disclosure relates to the field of communications technologies, and in particular, to a video transmission method, a video transmission device, a video transmission system, and a storage medium.

BACKGROUND

A mobile communications network has been upgraded from 3G to 4G. In addition to faster Internet access, a 4G network also provides high-definition voice and video call capabilities. The popularization of the 4G network brings vigorous development of various apps. Various instant messaging apps are continuously encroaching on a voice market of operators. Moreover, for a 5G network, instant messaging apps will provide more competitive service experience.

In the face of competition nowadays and greater risks in the future, the operators need to continuously reduce costs and provide better service experience. Two basic products provided by the operators for the public are traffic and calling. Demand for traffic consumption keeps increasing rapidly, and has become a main income source of the operators. Demand for calling has become saturated. Therefore, when planning a wireless network, the operators give priority to ensuring traffic planning, and calling comes next. Traffic and calling show differences in a wireless network. Traffic is characterized by small uplink traffic and large downlink traffic. Generally, uplink traffic is 10% of downlink traffic. According to a recommended construction standard of operators in China, uplink traffic is 0.5 Mbps and downlink traffic is 5 Mbps. A characteristic of calling is that audio calls require 24.85 Kbps in uplink and 24.85 Kbps in downlink, and video calls require 1 Mbps in uplink and 1 Mbps in downlink.

In other words, when a data-domain traffic requirement reaches a coverage standard, an audio-call requirement is also met, whereas a video-call requirement cannot be met. In addition, currently, consumption of a wireless network is mostly in downlink, so that the operators invest more resources in downlink. However, a call model is that quantities of resources consumed in uplink and downlink are the same, which easily causes a waste of a large quantity of resources.

SUMMARY

The present disclosure discloses a video transmission method, a video transmission device, a video transmission system, and a storage medium, to implement optimal utilization of network resources.

According to a first aspect, an embodiment of the present disclosure provides a video transmission method, including: A first media gateway receives an uplink media packet sent by a first terminal, where the uplink media packet carries information indicating that the first terminal supports an uplink-downlink resolution asymmetry capability and an uplink media stream of a first resolution of the first terminal. The first media gateway sends a first downlink media packet to the first terminal, where the first downlink media packet carries a downlink media stream of a second resolution of the first terminal, and the first resolution is different from the second resolution.

According to this embodiment, the first media gateway can receive the uplink media stream, of the first resolution, sent by the first terminal, and can further send the downlink media stream of the second resolution of the first terminal to the first terminal. The solution is applicable to the following case: In a video call process, a terminal that supports different resolutions in a sending direction and a receiving direction can lower a resolution based on channel quality to deliver a video packet, and can raise a resolution when network resources are sufficient. In this way, optimal utilization of network resources is implemented. Furthermore, image quality at a receiving end is ensured, video call quality is enhanced, viewing experience of a user is improved, and bandwidth costs of video transmission are reduced.

In an optional implementation, the method further includes: The first media gateway receives a second downlink media packet sent by a second media gateway, where the second downlink media packet carries a downlink media stream of a third resolution. The first media gateway performs super-resolution (SR) processing on the downlink media stream of the third resolution to obtain the downlink media stream of the second resolution.

When supporting super-resolution, the first media gateway performs super-resolution processing on an uplink media stream of a low resolution to obtain an uplink media stream of a high resolution that can be supported by a network resource, and then sends the processed uplink media stream to a terminal. The solution is applicable to super-resolution on a video media stream by using a video super-resolution capability of a media processing network element node when network resources are sufficient. In this way, optimal utilization of network resources is implemented. Furthermore, image quality at a receiving end is ensured, video call quality is enhanced, and viewing experience of a user is improved.

In another optional implementation, the method further includes: The first media gateway receives the first downlink media packet sent by a second media gateway.

The method further includes: The second media gateway receives a second downlink media packet sent by a second terminal, where the second downlink media packet carries a downlink media stream of a third resolution. The second media gateway performs super-resolution processing on the downlink media stream of the third resolution to obtain the downlink media stream of the second resolution. The second media gateway sends the downlink media stream of the second resolution to the first media gateway by using the first downlink media packet.

According to this embodiment, when the second media gateway has a super-resolution capability, the second media gateway performs super-resolution processing on an uplink media stream of a low resolution to obtain an uplink media stream of a high resolution that can be supported by a network resource, and then sends the processed uplink media stream to a terminal. The solution is applicable to super-resolution on a video media stream by using a video super-resolution capability of a media processing network element node when network resources are sufficient. In this way, optimal utilization of network resources is implemented. Furthermore, image quality at a receiving end is ensured, video call quality is enhanced, and viewing experience of a user is improved.

According to a second aspect, an embodiment of the present disclosure provides a video transmission method, including: A first terminal sends an uplink media packet to a media gateway, where the uplink media packet carries a resolution that is of a downlink media stream and that is supported by the first terminal and an uplink media stream of the first terminal. The first terminal receives a downlink media packet sent by the media gateway, where a resolution of a downlink media stream carried in the downlink media packet is the resolution supported by the first terminal.

According to this embodiment, when the first terminal sends the uplink media packet to the media gateway, the uplink media packet carries the resolution that is of the downlink media stream and that is supported by the first terminal and the uplink media stream of the first terminal. When the first terminal sends the uplink media stream, the resolution that is of the downlink media stream and that is supported by the first terminal is sent together with the uplink media stream, so that the resolution of the downlink media stream carried in the downlink media packet sent by the media gateway is the resolution supported by the first terminal. In this way, video transmission efficiency is improved, video transmission reliability is ensured, and bandwidth costs of video transmission are reduced.

The first terminal performs super-resolution on a received downlink media stream, and plays back the downlink media stream.

The uplink media packet carries information indicating that the first terminal supports an uplink-downlink resolution asymmetry capability.

The uplink media packet is an RTP packet.

The resolution that is of the downlink media stream and that is supported by the first terminal is carried in a header of the RTP packet.

The information indicating that the first terminal supports an uplink-downlink resolution asymmetry capability is carried in a header of the RTP packet.

Before the first terminal sends the uplink media packet to the media gateway, the method further includes: The first terminal sends a media session request to the media gateway, to request to establish a media session with a second terminal. The first terminal sends the uplink media packet to the media gateway after establishing the media session with the second terminal.

Alternatively, before the first terminal sends the uplink media packet to the media gateway, the method further includes: The first terminal receives a media session request of a second terminal sent by the media gateway, where the media session request is used to request to establish a media session with the first terminal; and the first terminal sends a media session response to the media gateway, to establish the media session with the second terminal. The first terminal sends the uplink media packet to the media gateway after establishing the media session with the second terminal.

The media session request is a session description protocol (SDP) session request.

The media session response carries indication information indicating that the first terminal supports a super-resolution capability.

According to a third aspect, an embodiment of the present disclosure further provides a video transmission method, including: A first media gateway receives a first message sent by a base station, where the first message carries a first resolution. The first media gateway sends a second message to a first terminal, where the second message carries the first resolution. The first media gateway receives and processes an uplink media packet sent by the first terminal, where the uplink media packet carries an uplink media stream of the first terminal, and a resolution of the uplink media stream is the first resolution.

According to this embodiment, the first media gateway sends the message to the first terminal based on the message sent by the base station, to indicate the first terminal to send a media stream of the resolution supported by the base station. In this way, video transmission efficiency is improved, and video transmission reliability is ensured.

The method further includes: The first media gateway performs super-resolution processing on the uplink media stream to obtain a video picture of a second resolution, where the second resolution is higher than the first resolution. The first media gateway sends the uplink media stream of the second resolution to a second terminal.

The method further includes: The first media gateway sends the uplink media packet to a second media gateway.

The first message is a first RTCP message, and the second message is a second RTCP message.

The uplink media packet is an uplink RTP packet.

According to a fourth aspect, an embodiment of the present disclosure further provides a video transmission method, including: A second media gateway receives an uplink media packet of a first terminal sent by a first media gateway, where the uplink media packet carries an uplink media stream of the first terminal, and a resolution of the uplink media stream is a first resolution. The second media gateway receives a third message sent by a base station, where the third message carries a second resolution, and the second resolution is higher than the first resolution. The second media gateway performs super-resolution processing on the uplink media stream to obtain a video picture of the second resolution. The second media gateway sends the uplink media stream of the second resolution to a second terminal.

According to this embodiment, when the second media gateway has a super-resolution capability, the second media gateway performs super-resolution processing on an uplink media stream of a low resolution to obtain an uplink media stream of a high resolution that can be supported by a network resource, and then sends the processed uplink media stream to a terminal. The solution is applicable to super-resolution on a video media stream by using a video super-resolution capability of a media processing network element node when network resources are sufficient. In this way, optimal utilization of network resources is implemented. Furthermore, image quality at a receiving end is ensured, video call quality is enhanced, and viewing experience of a user is improved.

The third message is a third RTCP message.

The uplink media packet is an uplink RTP packet.

According to a fifth aspect, an embodiment of the present disclosure further provides a video transmission method, including: A terminal receives an RTCP message sent by a media gateway, where the RTCP message carries a first resolution. The terminal sends an uplink media stream to the media gateway, where a resolution of the uplink media stream is the first resolution.

According to a sixth aspect, the present disclosure provides a video transmission device, including a memory and a processor that are coupled to each other. The memory stores computer program code. The processor invokes and executes the computer program code in the memory, so that the video transmission device performs the video transmission method.

According to a seventh aspect, the present disclosure provides a video transmission system, including a first media gateway, where the first media gateway is configured to: receive an uplink media packet sent by a first terminal, where the uplink media packet carries information indicating that the first terminal supports an uplink-downlink resolution asymmetry capability and an uplink media stream of a first resolution of the first terminal; and send a first downlink media packet to the first terminal, where the first downlink media packet carries a downlink media stream of a second resolution of the first terminal, and the first resolution is different from the second resolution.

The first media gateway is further configured to: receive a second downlink media packet sent by a second media gateway, where the second downlink media packet carries a downlink media stream of a third resolution; and perform super-resolution processing on the downlink media stream of the third resolution to obtain the downlink media stream of the second resolution.

The first media gateway is further configured to receive the first downlink media packet sent by a second media gateway.

The system further includes a second media gateway. The second media gateway is configured to: receive a second downlink media packet sent by a second terminal, where the second downlink media packet carries a downlink media stream of a third resolution: perform super-resolution processing on the downlink media stream of the third resolution to obtain the downlink media stream of the second resolution; and send the downlink media stream of the second resolution to the first media gateway by using the first downlink media packet.

According to an eighth aspect, the present disclosure provides a terminal device, configured to: send an uplink media packet to a media gateway, where the uplink media packet carries a resolution that is of a downlink media stream and that is supported by the terminal device and an uplink media stream of the terminal device; and receive a downlink media packet sent by the media gateway, where a resolution of a downlink media stream carried in the downlink media packet is the resolution supported by the terminal device.

The terminal device is further configured to perform super-resolution on a received downlink media stream, and play back the downlink media stream.

The terminal device is further configured to: send a media session request to the media gateway, to request to establish a media session with a second terminal; and send the uplink media packet to the media gateway after establishing the media session with the second terminal.

The terminal device is further configured to: receive a media session request of a second terminal sent by the media gateway, where the media session request is used to request to establish a media session with the terminal device: send a media session response to the media gateway, to establish the media session with the second terminal; and send the uplink media packet to the media gateway after establishing the media session with the second terminal.

According to a ninth aspect, the present disclosure provides a computer storage medium, including computer instructions. When the computer instructions are run on an electronic device, the electronic device is enabled to perform the method according to any possible implementation of the first aspect and/or any possible implementation of the second aspect and/or any possible implementation of the third aspect and/or any possible implementation of the fourth aspect and/or any possible implementation of the fifth aspect.

According to a tenth aspect, an embodiment of the present disclosure provides a computer program product. When the computer program product is run on a computer, the computer is enabled to perform the method according to any possible implementation of the first aspect and/or any possible implementation of the second aspect and/or any possible implementation of the third aspect and/or any possible implementation of the fourth aspect and/or any possible implementation of the fifth aspect.

According to an eleventh aspect, the present disclosure provides a base station device. The device includes a memory and a processor. The memory stores computer instructions. The processor invokes and executes the computer instructions in the memory, so that a base station performs the foregoing media video transmission method, and communicates with a first media gateway and/or a second media gateway.

In a possible solution, the base station communicates with a terminal device.

According to a twelfth aspect, the present disclosure provides a terminal device. The device includes a memory and a processor. The memory stores computer instructions. The processor invokes and executes the computer instructions in the memory, so that the terminal device performs the foregoing media video transmission method, and communicates with a first media gateway and/or a second media gateway.

In a possible solution, the terminal device is a first terminal or a second terminal.

It can be understood that the device according to the sixth aspect, the system according to the seventh aspect, the terminal according to the eighth aspect, the computer storage medium according to the ninth aspect, and the computer program product according to the tenth aspect that are provided above are all configured to perform the method according to any implementation of the first aspect, the method according to any implementation of the second aspect, the method according to any possible implementation of the third aspect, the method according to any possible implementation of the fourth aspect, and the method according to any possible implementation of the fifth aspect. Therefore, for beneficial effects that can be achieved by the device, the system, the terminal, the computer storage medium, and the computer program product, references may be made to beneficial effects of the corresponding methods, and details are not described herein again.

In the solutions provided in all of the foregoing aspects, the uplink media packet carries an uplink and downlink resolution set supported by the first terminal.

In a possible solution, the uplink media packet carries an indication indicating whether the super-resolution capability of the first terminal is enabled.

In a possible solution, the first media gateway sends the uplink media packet to the second media gateway or the second terminal.

In a possible solution, the first media gateway sends a notification message to the base station, where the notification message carries the information indicating that the first terminal supports the uplink-downlink resolution asymmetry capability.

In a possible solution, the second media gateway receives the uplink media packet sent by the first media gateway, and sends a notification message to the base station, where the notification message carries the information indicating that the first terminal supports the uplink-downlink resolution asymmetry capability.

In a possible solution, the notification message is an RTCP message.

In the solutions provided above, the super-resolution capability information is transferred and negotiated by using the media-plane uplink media packet and RTCP message. Compared with transferring and negotiating the super-resolution capability information by using a signaling-plane message, processing and negotiation efficiency is higher.

BRIEF DESCRIPTION OF DRAWINGS

The following describes accompanying drawings used in embodiments of the present disclosure.

DESCRIPTION OF EMBODIMENTS

The following describes embodiments of the present disclosure with reference to the accompanying drawings in embodiments of the present disclosure. Terms used in embodiments of the present disclosure are only used to explain specific embodiments of the present disclosure, but are not intended to limit the present disclosure.

Figure 1A:
FIG. 1a is a schematic diagram of a structure of a video transmission system according to an embodiment of the present disclosure.

FIG. 1a is a schematic diagram of a video transmission system according to an embodiment of the present disclosure. The video transmission system may include a first terminal and a first media gateway. The first media gateway is configured to receive an uplink media packet sent by the first terminal. The uplink media packet carries information indicating that the first terminal supports an uplink-downlink resolution asymmetry capability and an uplink media stream of a first resolution of the first terminal. The first media gateway is further configured to send a first downlink media packet to the first terminal. The first downlink media packet carries a downlink media stream of a second resolution of the first terminal. The first resolution is different from the second resolution.

Figure 1B:
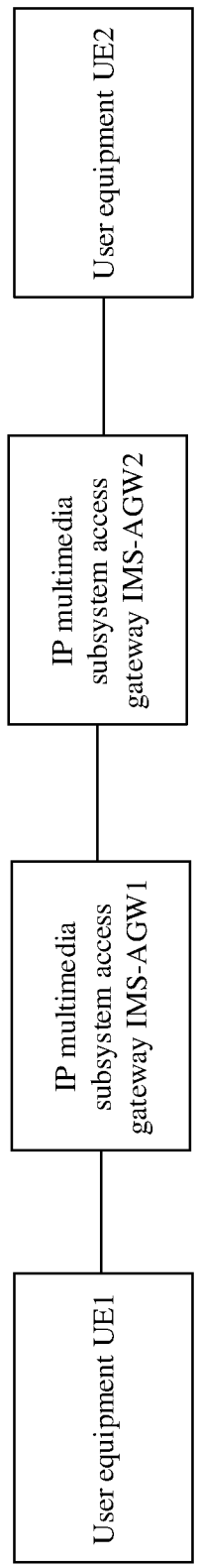
FIG. 1b is a schematic diagram of a structure of another video transmission system according to an embodiment of the present disclosure.

Further, the first media gateway may be an IP multimedia subsystem access gateway IMS-AGW1 in a video transmission system shown in FIG. 1b, and the first terminal may be user equipment UE1. Optionally, the first media gateway may alternatively be an IMS-AGW2 in FIG. 1b, and the first terminal may alternatively be user equipment UE2. The user equipment may be referred to as a terminal.

Only an IMS access gateway (IMS-AGW) is used as an example to describe the media gateway in this embodiment. The media gateway may alternatively be a multimedia resource function (MRF) device or a session border controller (SBC) of an IMS core network. This is not specifically limited in this solution.

According to this embodiment, the first media gateway can receive the uplink media stream, of the first resolution, sent by the first terminal, and can further send the downlink media stream of the second resolution of the first terminal to the first terminal. The solution is applicable to the following case: In a video call process, a terminal that supports different resolutions in a sending direction and a receiving direction can lower a resolution based on channel quality to deliver a video packet, and can raise a resolution when network resources are sufficient. In this way, optimal utilization of network resources is implemented. Furthermore, image quality at a receiving end is ensured, video call quality is enhanced, viewing experience of a user is improved, and bandwidth costs of video transmission are reduced. The foregoing video call may be implemented based on voice over LTE (VOLTE), or may be implemented based on voice over NR (VONR).

When the first media gateway supports super-resolution, the first media gateway is further configured to receive a second downlink media packet sent by a second media gateway, where the second downlink media packet carries a downlink media stream of a third resolution. The first media gateway performs super-resolution processing on the downlink media stream of the third resolution to obtain the downlink media stream of the second resolution. The second resolution is higher than the third resolution.

The first media gateway is further configured to receive the first downlink media packet sent by a second media gateway.

When a second media gateway supports super-resolution, the second media gateway is configured to receive a second downlink media packet sent by a second terminal, where the second downlink media packet carries a downlink media stream of a third resolution. The second media gateway performs super-resolution processing on the downlink media stream of the third resolution to obtain the downlink media stream of the second resolution. The second media gateway sends the downlink media stream of the second resolution to the first media gateway by using the first downlink media packet.

Figure 1C:
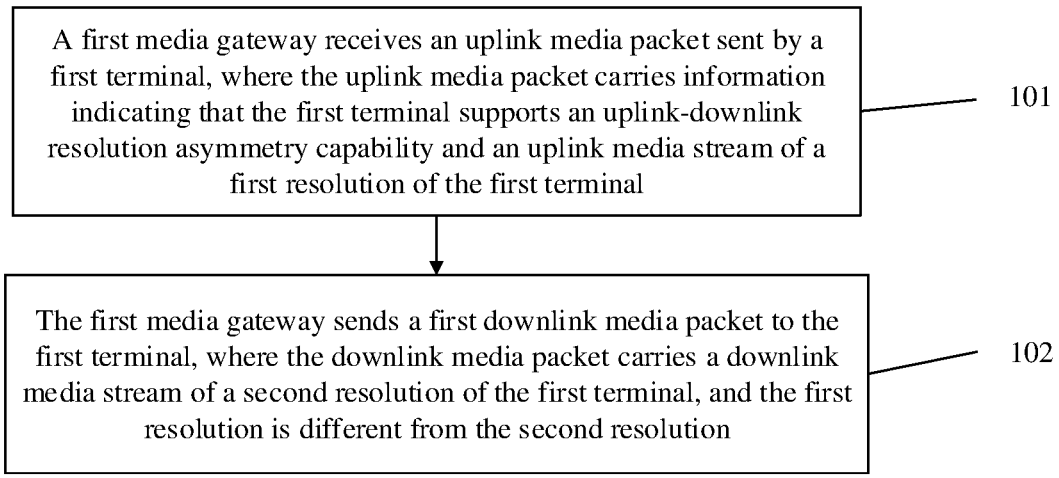
FIG. 1c is a schematic flowchart of a video transmission method according to an embodiment of the present disclosure.

FIG. 1c is a schematic flowchart of a video transmission method according to an embodiment of the present disclosure. As shown in FIG. 1c, the method includes steps 101 and 102, which are specifically as follows:

101: A first media gateway receives an uplink media packet sent by a first terminal, where the uplink media packet carries information indicating that the first terminal supports an uplink-downlink resolution asymmetry capability and an uplink media stream of a first resolution of the first terminal.

The information indicating that the first terminal supports the uplink-downlink resolution asymmetry capability indicates that the first terminal supports different resolutions in a receiving direction and a sending direction.

The uplink media packet is a real-time transport protocol (RTP) packet. The information indicating that the first terminal supports the uplink-downlink resolution asymmetry capability may be carried in a header of the RTP packet.

Specifically, an example in which the information indicating that the terminal supports the uplink-downlink resolution asymmetry capability is added to an RTP header extension may be as follows:

ResSymmetry {0, 1}, where this field occupies 2 bits, indicating whether the terminal supports asymmetric uplink and downlink resolutions. When a value of the field is 0, which corresponds to "limited", it indicates that the terminal supports only uplink-downlink symmetry. When a value of the field is 1, which corresponds to "no limited", it indicates that the terminal does not limit whether uplink and downlink resolutions are symmetric, that is, the terminal supports asymmetric uplink and downlink resolutions.

The first media gateway may send, to a second media gateway, the received uplink media packet sent by the first terminal, so that the second media gateway sends, to a second terminal, the uplink media packet sent by the first terminal.

102: The first media gateway sends a first downlink media packet to the first terminal, where the downlink media packet carries a downlink media stream of a second resolution of the first terminal, and the first resolution is different from the second resolution.

The first media gateway may further send the first downlink media packet to the first terminal, where the downlink media packet carries the downlink media stream of the second resolution of the first terminal. Because the first terminal supports the uplink-downlink resolution asymmetry capability, the first media gateway may send the downlink media stream of the second resolution to the first terminal based on a network resource status, and the first media gateway may further receive the uplink media stream, of the first resolution, sent by the first terminal. The first resolution is different from the second resolution. Both the first resolution and the second resolution are resolutions supported by the first terminal.

The first media gateway may receive the first downlink media packet sent by the second media gateway. Specifically, the second media gateway may send, to the first media gateway, the received first downlink media packet sent by the second terminal, so that the first media gateway sends, to the first terminal, the first downlink media packet sent by the second terminal.

Before the first media gateway sends the first downlink media packet to the first terminal, the first media gateway may further receive a second downlink media packet sent by the second media gateway, where the second downlink media packet carries a downlink media stream of a third resolution; and the first media gateway performs super-resolution processing on the downlink media stream of the third resolution to obtain the downlink media stream of the second resolution.

In other words, when the first media gateway supports super-resolution, the first media gateway may perform super-resolution processing on the received downlink media stream of the third resolution, to obtain the downlink media stream of the second resolution. Then, the first media gateway sends the downlink media stream of the second resolution to the first terminal. The second resolution is higher than the third resolution.

According to this embodiment, the first media gateway can receive the uplink media stream, of the first resolution, sent by the first terminal, and can further send the downlink media stream of the second resolution of the first terminal to the first terminal. The solution is applicable to the following case: In a video call process, a terminal that supports different resolutions in a sending direction and a receiving direction can lower a resolution based on channel quality to deliver a video packet, and can raise a resolution when network resources are sufficient. In this way, optimal utilization of network resources is implemented. Furthermore, image quality at a receiving end is ensured, video call quality is enhanced, viewing experience of a user is improved, and bandwidth costs of video transmission are reduced.

Figure 2A:
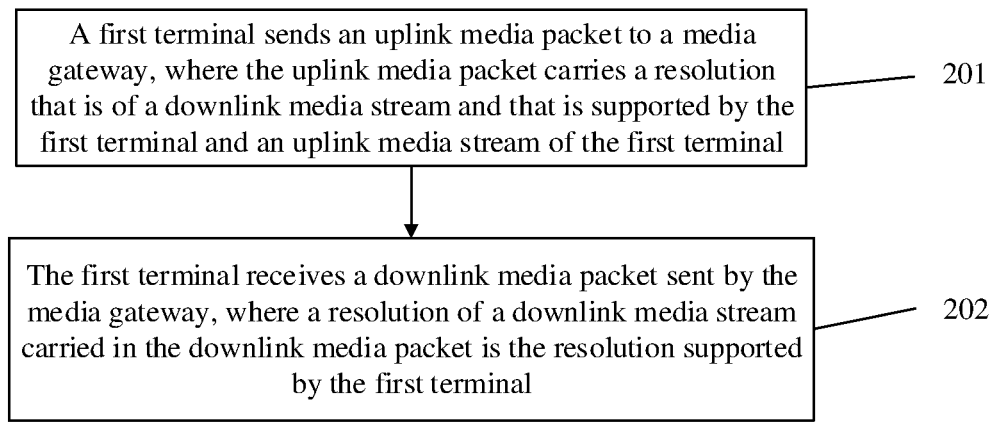
FIG. 2a is a schematic flowchart of another video transmission method according to an embodiment of the present disclosure.

FIG. 2a is a schematic flowchart of another video transmission method according to an embodiment of the present disclosure. As shown in FIG. 2a, the method includes steps 201 and 202, which are specifically as follows:

201: A first terminal sends an uplink media packet to a media gateway, where the uplink media packet carries a resolution that is of a downlink media stream and that is supported by the first terminal and an uplink media stream of the first terminal.

The resolution that is of the downlink media stream and that is supported by the first terminal is used to indicate a media stream resolution supported by the first terminal in a downlink direction.

The uplink media packet may be an RTP packet. The resolution that is of the downlink media stream and that is supported by the first terminal is carried in a header of the RTP packet.

Further, the uplink media packet may further carry information indicating that the first terminal supports an uplink-downlink resolution asymmetry capability. The information indicating that the first terminal supports the uplink-downlink resolution asymmetry capability is carried in the header of the RTP packet.

Figure 2B:
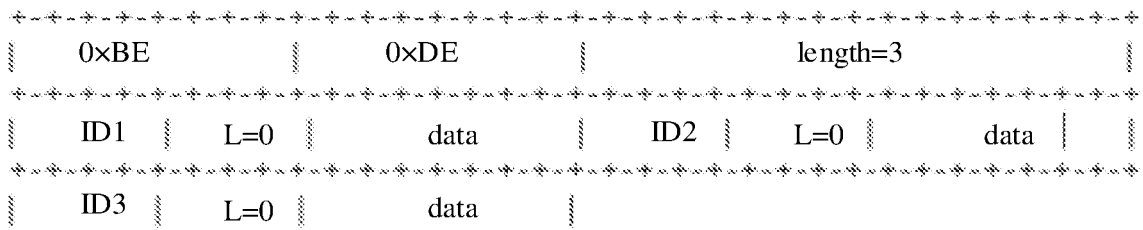
FIG. 2b is a schematic diagram of a structure of an RTP packet according to an embodiment of the present disclosure.

A header extension of the RTP packet may carry the resolution that is of the downlink media stream and that is supported by the first terminal and the information indicating that the first terminal supports the uplink-downlink resolution asymmetry capability, and the header extension of the RTP packet may further carry information indicating whether the first terminal supports a super-resolution capability. The three parameters may respectively correspond to fields ID1, ID2, and ID3 in an RTP packet structure in FIG. 2b. The RTP header extension may include two formats. The RTP packet structure in FIG. 2b is a 1-byte header extension. In the RTP packet structure, 0xBE and 0xDE fields indicate that the RTP header extension is in a 1-byte header extension pattern, that is, in each extension unit (including ID+len+data), ID+len occupies one byte; and a length field indicates a length. Alternatively, the RTP header extension may be a 2-byte header extension. Correspondingly, the 0xBE and 0xDE fields in FIG. 2b are respectively replaced with 0x10 and 0x00 fields. Herein, 0x10 and 0x00 indicate that the RTP header extension is in a 2-byte header extension pattern, that is, in each extension unit (including ID+len+data), ID+len occupies two bytes.

Details are as follows: (a) ResSymmetry {0, 1}: This field occupies 2 bits, indicating whether the terminal supports asymmetric uplink and downlink resolutions. When a value of the field is 0, which corresponds to "limited", it indicates that the terminal supports only uplink-downlink symmetry. When a value of the field is 1, which corresponds to "no limited", it indicates that the terminal does not limit whether uplink and downlink resolutions are symmetric, that is, the terminal supports asymmetric uplink and downlink resolutions.

(b) ResolutionSet{0, 1, 2, 3, 4, 5}: This field occupies 4 bits, indicating a resolution set supported by the terminal. When a value of the field is 0, 180p is supported. When a value of the field is 1, 360p is supported. When a value of the field is 2, 720p is supported. When a value of the field is 3, 1080p is supported. When a value of the field is 4, 2K is supported. When a value of the field is 5, 4K is supported. A reserved bit may be extended based on an actual situation, and is not specifically limited herein.

(c) SuperResInd: This field occupies 2 bits, indicating whether the terminal supports the super-resolution capability. When a value of the field is 0, which means "on", it indicates that the terminal supports super-resolution. When a value of the field is 1, which means "off", it indicates that the terminal does not support super-resolution.

In this solution, when an intermediate network element performs super-resolution, the RTP packet carries (d) ExecutorforRS: occupying 8 bits, used to carry an identifier of the network element that performs super-resolution.

(e) AlgorithmParaofSR { }: This field occupies 8 bits, which are reserved bits, and is used to extend a parameter of a super-resolution algorithm based on an actual situation. If ID4 needs to be extended, it indicates AlgorithmParaofSR.

When the first terminal is a calling party, before step 201, the method further includes steps A11 and A12, which are specifically as follows:

A11: The first terminal sends a media session request to the media gateway, to request to establish a media session with a second terminal.

The media session request may be an SDP session request.

A12: The first terminal sends the uplink media packet to the media gateway after establishing the media session with the second terminal.

Step 201 can be triggered after the first terminal establishes the media session with the second terminal.

Further, when the first terminal is a called party, before step 201, the method may further include steps B11 to B13, which are specifically as follows:

B11: The first terminal receives a media session request of a second terminal sent by the media gateway, where the media session request is used to request to establish a media session with the first terminal.

The media session request may be an SDP session request.

B12: The first terminal sends a media session response to the media gateway, to establish the media session with the second terminal.

The media session response may carry indication information indicating that the first terminal supports the super-resolution capability, where the indication information is used to indicate that the first terminal can perform super-resolution.

The media session request may carry super-resolution capability information of the second terminal, and the media session response may carry super-resolution capability information of the first terminal.

Specifically, ID1, ID2, and ID3 are defined in a=extmap in an SDP, corresponding to a line m of media in a video call. Syntax of a=extmap is as follows:
 a=extmap:<value>["/"<direction>]
  <URI><extensionattributes>

When a=extmap:1 URI-ResSymmetry, it indicates whether the terminal supports asymmetric uplink and downlink resolutions.

When a=extmap:2 URI-ResolutionSet, it indicates the resolution set supported by the terminal.

When a=extmap:3/recvonly URI-SuperRes, 2 bits are occupied, indicating whether the terminal supports the super-resolution capability. When a value is 0, which corresponds to "on", it indicates that the terminal supports super-resolution. When a value is 1, which corresponds to "off", the terminal does not support super-resolution.

B13: The first terminal sends the uplink media packet to the media gateway after establishing the media session with the second terminal.

Step 201 can be triggered after the first terminal establishes the media session with the second terminal.

202: The first terminal receives a downlink media packet sent by the media gateway, where a resolution of a downlink media stream carried in the downlink media packet is the resolution supported by the first terminal.

The uplink media packet carries the resolution that is of the downlink media stream and that is supported by the first terminal. Therefore, the resolution of the downlink media stream carried in the downlink media packet sent by the media gateway is the resolution supported by the first terminal.

According to this embodiment, when the first terminal sends the uplink media packet to the media gateway, the uplink media packet carries the resolution that is of the downlink media stream and that is supported by the first terminal and the uplink media stream of the first terminal. When the first terminal sends the uplink media stream, the resolution that is of the downlink media stream and that is supported by the first terminal is sent together with the uplink media stream, so that the resolution of the downlink media stream carried in the downlink media packet sent by the media gateway is the resolution supported by the first terminal. In this way, video transmission efficiency is improved, video transmission reliability is ensured, and bandwidth costs of video transmission are reduced.

Figure 3A:
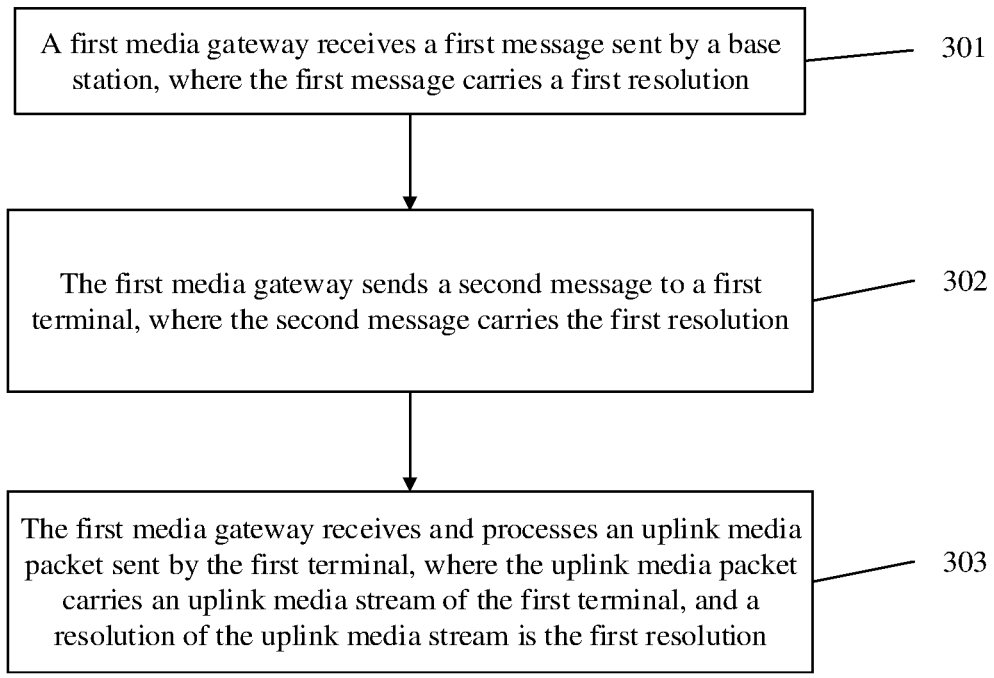
FIG. 3a is a schematic flowchart of another video transmission method according to an embodiment of the present disclosure.

FIG. 3*a* is a schematic flowchart of another video transmission method according to an embodiment of the present disclosure. As shown in FIG. 3*a*, the method includes steps 301 to 303, which are specifically as follows:

301: A first media gateway receives a first message sent by a base station, where the first message carries a first resolution.

When sensing that channel quality or a radio resource changes, the base station determines, based on a current network resource, the first resolution that can be supported by the base station.

The first media gateway may receive the first message that is sent by the base station and that carries the first resolution. The first message may be an RTCP message.

Figure 3B:
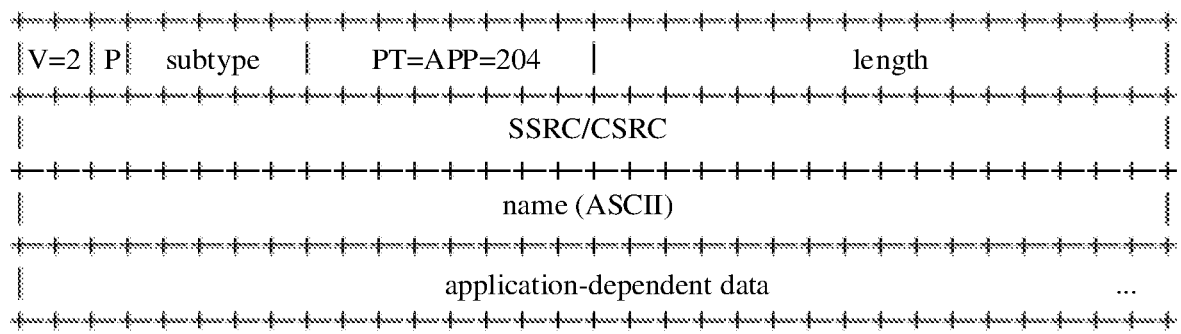
FIG. 3b is a schematic diagram of a structure of an RTCP message according to an embodiment of the present disclosure.

Specifically, FIG. 3*b* shows a format of a real-time transport control protocol (RTCP) message. In the RTCP message, a V field indicates that a protocol version number is 2, a P field indicates additional information, and a PT field indicates a payload, that is, marks a type of information carried in an RTP/RTCP packet, including a plurality of types, one of which is APP. There may be the following types: RR: receiver report: SR: sender report: SDES: source description items: BYE: indicates end of participation; and APP: application specific functions. A length field indicates a length. An SSRC field indicates a data source identifier. A CSRC field indicates a contribution data source identifier. The RTCP message further includes a name field. An application-dependent data field indicates content carried when PT is APP, for example, an expected target resolution is carried, where a unit of the expected target resolution is kpbs.

302: The first media gateway sends a second message to a first terminal, where the second message carries the first resolution.

The first media gateway sends the second message to the first terminal based on the first message sent by the base station. The second message carries the first resolution to indicate the first terminal to send an uplink media stream of the first resolution.

The second message may also be an RTCP message.

303: The first media gateway receives and processes an uplink media packet sent by the first terminal, where the uplink media packet carries an uplink media stream of the first terminal, and a resolution of the uplink media stream is the first resolution.

The first media gateway may send the uplink media packet to a second media gateway.

Further, when the first media gateway supports super-resolution, the first media gateway may perform super-resolution processing on the uplink media stream to obtain a video picture of a second resolution. The second resolution is higher than the first resolution. The first media gateway sends the uplink media stream of the second resolution to a second terminal.

The uplink media packet is an uplink RTP packet.

According to this embodiment, the first media gateway sends the message to the first terminal based on the message sent by the base station, to indicate the first terminal to send a media stream of the resolution supported by the base station. In this way, when a radio resource dynamically changes, a video resolution can be adaptively adjusted, thereby improving video transmission efficiency and ensuring video transmission reliability.

Figure 4:
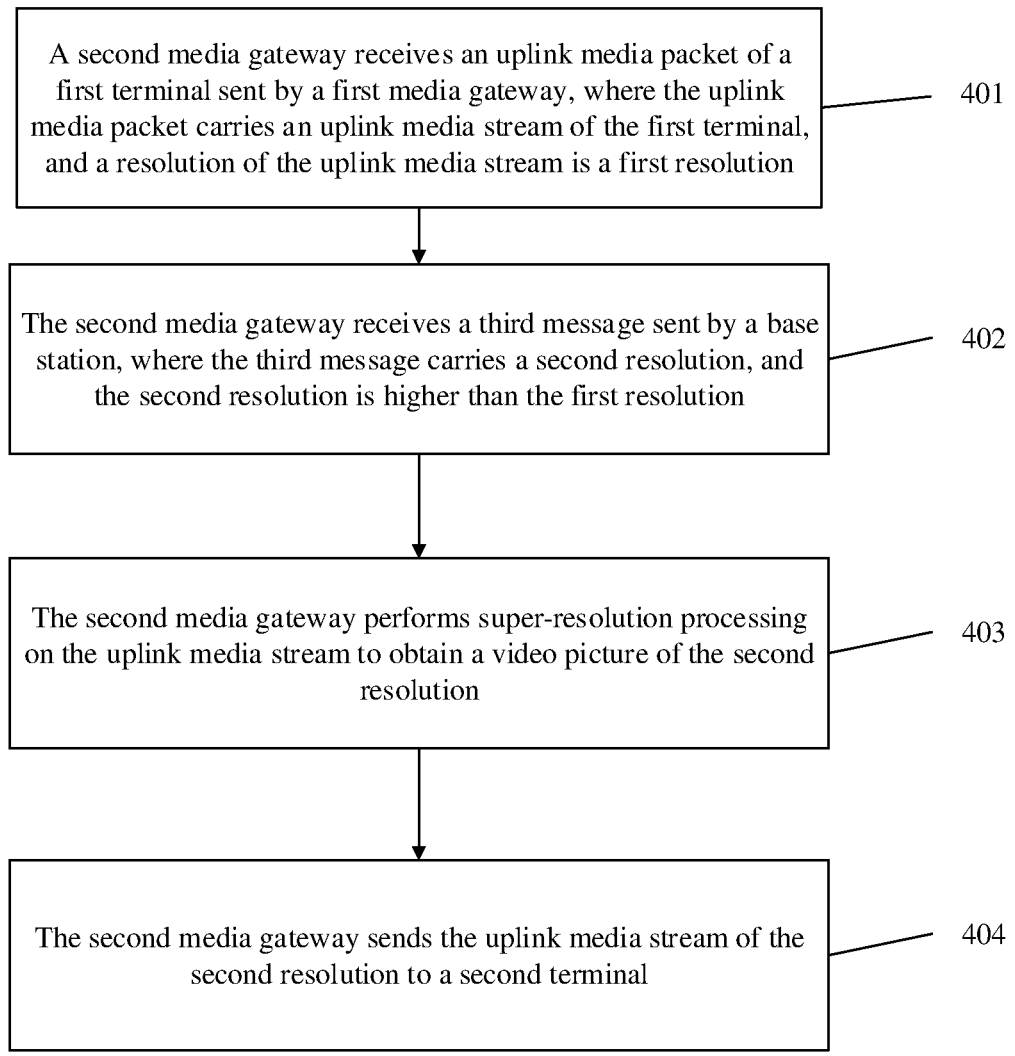
FIG. 4 is a schematic flowchart of still another video transmission method according to an embodiment of the present disclosure.

FIG. 4 is a schematic flowchart of still another video transmission method according to an embodiment of the present disclosure. As shown in FIG. 4, the method includes steps 401 to 404, which are specifically as follows:

401: A second media gateway receives an uplink media packet of a first terminal sent by a first media gateway, where the uplink media packet carries an uplink media stream of the first terminal, and a resolution of the uplink media stream is a first resolution.

The uplink media packet is an uplink RTP packet.

Optionally, the first resolution may be obtained from a base station based on the method in FIG. 3a, and the first resolution is supported by a second terminal.

402: The second media gateway receives a third message sent by the base station, where the third message carries a second resolution, and the second resolution is higher than the first resolution.

The third message is an RTCP message.

The base station in this embodiment and the base station in the embodiment in FIG. 3a may be the same base station, or may be different base stations. This is not specifically limited herein.

403: The second media gateway performs super-resolution processing on the uplink media stream to obtain a video picture of the second resolution.

When the second media gateway supports super-resolution, the second media gateway may perform super-resolution processing on the uplink media stream to obtain a high-resolution media stream.

404: The second media gateway sends the uplink media stream of the second resolution to the second terminal.

According to this embodiment, when the second media gateway has a super-resolution capability, the second media gateway performs super-resolution processing on an uplink media stream of a low resolution to obtain an uplink media stream of a high resolution that can be supported by a network resource, and then sends the processed uplink media stream to a terminal. The solution is applicable to super-resolution on a video media stream by using a video super-resolution capability of a media processing network element node when network resources are sufficient. In this way, optimal utilization of network resources is implemented. Furthermore, image quality at a receiving end is ensured, video call quality is enhanced, and viewing experience of a user is improved.

An embodiment of the present disclosure further provides a video transmission method. The method includes the following steps:

A first media gateway receives a first packet sent by a first terminal, where the first packet carries super-resolution capability indication information of the first terminal and resolutions supported by the first terminal, and the super-resolution capability indication information of the first terminal is used to indicate whether the first terminal has a super-resolution capability.

The first media gateway sends a second packet to a second media gateway, where the second packet carries reference super-resolution capability indication information and the resolutions supported by the first terminal, and the reference super-resolution capability indication information is used to indicate whether the first media gateway has a super-resolution capability and whether the first terminal has the super-resolution capability.

The first media gateway receives a video picture, of a first resolution, sent by the second media gateway, where the first resolution is a resolution supported by the first terminal, and the first resolution is a resolution that can be supported by a network resource.

When the reference super-resolution capability indication information indicates that the first media gateway has the super-resolution capability and the first terminal does not have the super-resolution capability, the first media gateway performs super-resolution processing on the video picture of the first resolution to obtain a video picture of a second resolution, where the second resolution is higher than the first resolution, the second resolution is a resolution supported by the first terminal, and the second resolution is a resolution that can be supported by the network resource.

The first media gateway sends the video picture of the second resolution to the first terminal.

According to this embodiment, when the first media gateway has the super-resolution capability and the first terminal does not have the super-resolution capability, the first media gateway performs super-resolution processing on a received video picture of a low resolution that can be supported by the network resource, to obtain a video picture of a high resolution that can be supported by the network resource, and then sends the high-resolution video picture to a terminal. The solution is applicable to the following case:

In a video call process, a terminal that supports different resolutions in a sending direction and a receiving direction can lower a resolution based on channel quality to deliver a video packet, and can perform super-resolution on a video media stream by using a video super-resolution capability of a media processing network element node when network resources are sufficient. In this way, optimal utilization of network resources is implemented. Furthermore, image quality at a receiving end is ensured, video call quality is enhanced, viewing experience of a user is improved, and bandwidth costs of video transmission are reduced.

The method further includes the following step:

When the reference super-resolution capability indication information indicates that the first terminal has the super-resolution capability, the first media gateway sends the video picture of the first resolution to the first terminal after receiving the video picture of the first resolution, so that the first terminal performs super-resolution processing on the video picture of the first resolution to obtain a video picture of a third resolution, where the third resolution is higher than the first resolution, the third resolution is a resolution supported by the first terminal, and the third resolution is a resolution that can be supported by the network resource.

The method further includes the following step:

When the reference super-resolution capability indication information indicates that neither the first terminal nor the first media gateway has the super-resolution capability, the first media gateway sends the video picture of the first resolution to the first terminal after receiving the video picture of the first resolution.

The first resolution is determined by the second media gateway based on a reference resolution and the resolutions supported by the first terminal. The reference resolution is obtained by the second media gateway from a first base station.

Further, if the reference resolution is a resolution supported by the first terminal, the reference resolution is the first resolution: or
   if the reference resolution is not a resolution supported by the first terminal, a resolution lower than the reference resolution in the resolutions supported by the first terminal is the first resolution.

Before the first media gateway performs super-resolution processing on the video picture of the first resolution, the method further includes the following step:

The first media gateway receives a third packet sent by a second base station, where the third packet carries the second resolution.

The first packet is a media stream packet. The super-resolution capability indication information of the first terminal, asymmetry capability indication information of the first terminal, and the resolutions supported by the first terminal are all located in a header extension of the media stream packet.

The third packet is a media control packet.

The first packet further carries the asymmetry capability indication information of the first terminal. The asymmetry capability indication information of the first terminal is used to indicate whether the first terminal supports different resolutions in a sending direction and a receiving direction.

In the following, a video transmission method provided in the embodiments of the present disclosure is described in detail by using three specific embodiments.

Figure 5A:
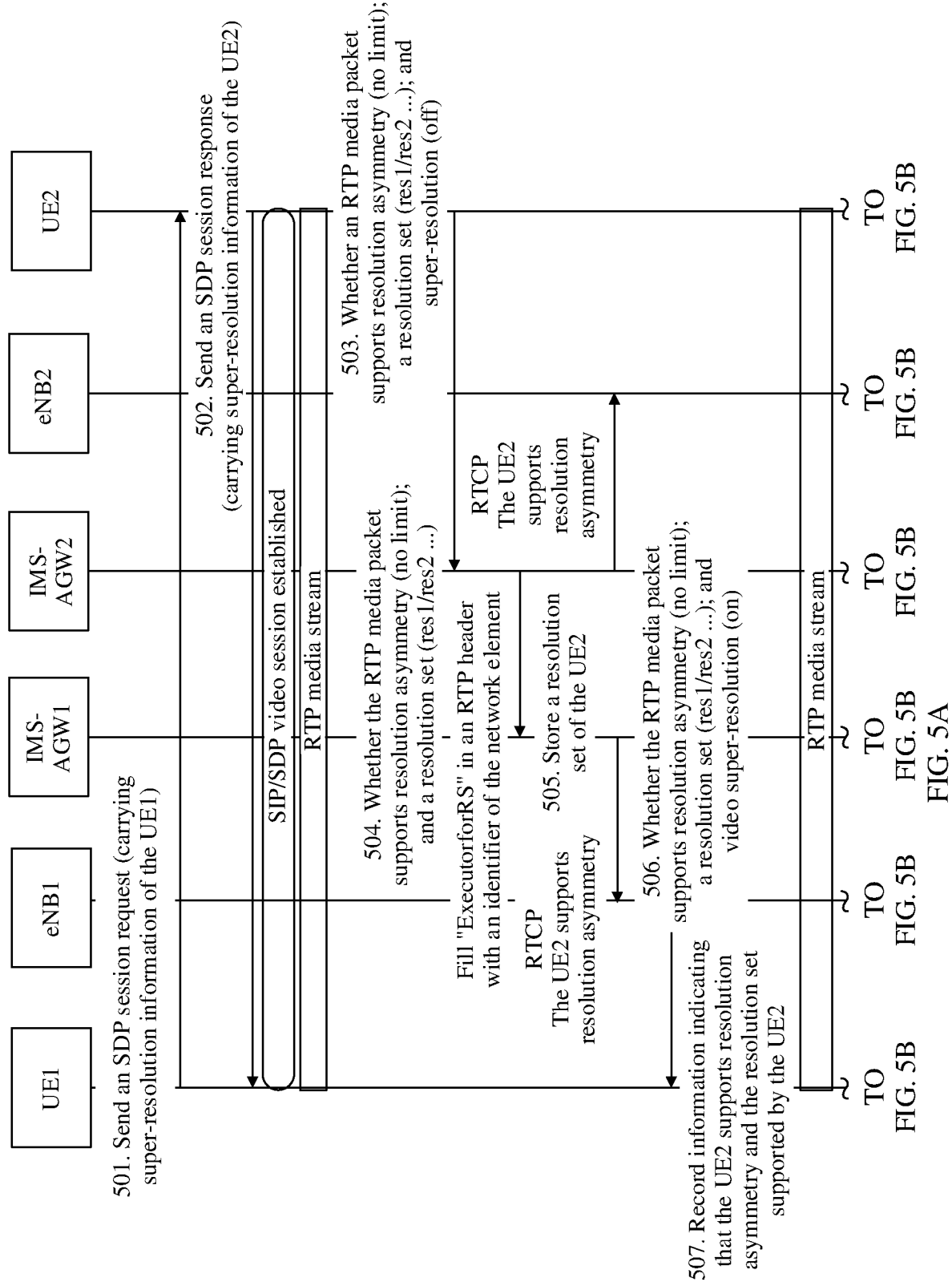
FIG. 5A and FIG. 5B are a schematic flowchart of a video transmission method according to an embodiment of the present disclosure.
Figure 5B:
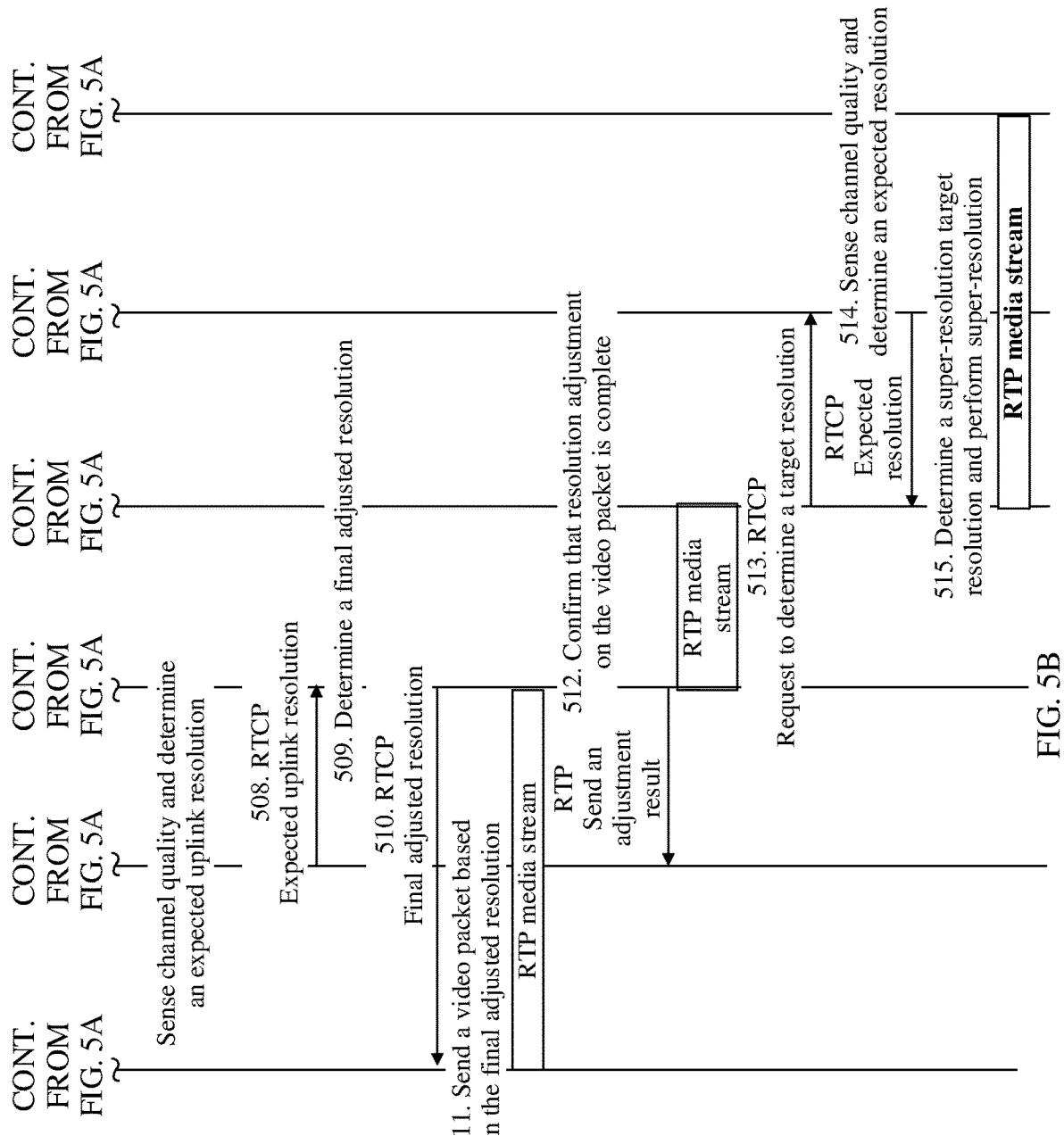

In an implementation, FIG. 5A and FIG. 5B are a schematic flowchart of a video transmission method according to an embodiment of the present disclosure. The method includes steps 501 to 515, which are specifically as follows.

501: A user terminal UE1 sends an SDP session request to a user terminal UE2.

The SDP session request carries super-resolution information of the user terminal UE1.

502: After receiving the SDP session request, the user terminal UE2 sends an SDP session response to the user terminal UE1.

After receiving the SDP session request, the user terminal UE2 identifies a video call initiated by the UE1, and adds super-resolution information of the UE2 to the SDP session response. The super-resolution information is located in a=extmap of SDP, which carries RTP header extension information.

In this case, a session initiation protocol (SIP)/SDP video session is established, and bidirectional media stream sending can be performed.

503: After the session is established, the UE2 sends a packet to an IMS-AGW2, where the packet carries super-resolution capability indication information of the UE2 and resolutions supported by the UE2.

After the session is established, in an RTP media stream initiated by the UE2, an RTP packet header extension carries a resolution set supported by the UE2 and information indicating that the UE2 does not support video super-resolution.

Further, the packet may further carry asymmetry capability information of the UE2. The asymmetry capability information is used to indicate that the UE2 supports asymmetric resolutions in a sending direction and a receiving direction.

504: The IMS-AGW2 parses the packet, stores the resolutions supported by the UE2, and sends a packet to an IMS-AGW1 after identifying that the UE2 has no super-resolution capability, where the packet is used to indicate that the IMS-AGW2 has a super-resolution capability.

The IMS-AGW2 identifies the RTP header extension information, identifies that the UE2 supports asymmetric resolutions, that is, changing a resolution in a single direction is possible, stores the resolution set supported by the UE2, and identifies, based on a parameter "SuperResInd" in the RTP header extension information, that the UE2 does not support video super-resolution. If the IMS-AGW2 supports super-resolution, "ExecutorforRS" in the RTP header extension is filled with a network element identifier of the IMS-AGW2, to indicate that the IMS-AGW2 can perform super-resolution processing on a video stream that is to be received from the IMS-AGW1 and then send the processed video stream to the UE2.

Specifically, the IMS-AGW2 forwards the RTP header extension information to the IMS-AGW1, where the RTP header extension information carries identification RTP header extension parameters, that is, information indicating that the UE2 supports asymmetric uplink and downlink resolutions, the resolution set supported by the UE2, and an identifier of a network element or a terminal that performs super-resolution. Herein, the identifier of the network element or the terminal that performs super-resolution is the network element identifier of the IMS-AGW2.

In addition, the IMS-AGW2 notifies an eNB2 that the UE2 supports resolution asymmetry, to indicate that the UE2 supports unidirectional resolution adjustment.

Further, if the UE2 does not support resolution asymmetry, during resolution adjustment based on a resource, resolutions in the receiving direction and the sending direction of the UE2 can be simultaneously adjusted.

505: The IMS-AGW1 identifies the "identifier of the network element or the terminal that performs super-resolution", that is, a front end performs super-resolution; and the IMS-AGW1 stores the resolution set of the UE2.

The IMS-AGW1 further notifies an eNB1 that the UE2 supports asymmetric uplink and downlink resolutions, that is, indicates that the UE2 supports unidirectional resolution adjustment.

506: The IMS-AGW1 forwards the RTP header extension information to the UE1, where the information carries information indicating that the UE2 supports asymmetric resolutions, the resolution set supported by the UE2, and the "identifier of the network element or the terminal that performs super-resolution".

507: The UE1 records the information indicating that the UE2 supports resolution asymmetry and the resolution set supported by the UE2.

In this process, bidirectional media streams are still being continuously sent.

When the eNB1 senses a change in channel quality or a radio resource, that is, a change in uplink channel quality or an uplink radio resource, the eNB1 determines, based on a current resource, a resolution that can be supported by the eNB1.

If both uplink and downlink resources deteriorate and the UE2 supports resolution asymmetry, the eNB1 may determine corresponding uplink and downlink adjusted target resolutions based on the uplink and downlink resources, respectively. If both uplink and downlink resources deteriorate and the UE2 does not support resolution asymmetry, the eNB1 may determine uniform uplink and downlink target resolutions based on a worst resource in the uplink and downlink resources.

508: The eNB1 notifies the IMS-AGW1 of an expected adjusted resolution of the eNB1.

509: The IMS-AGW1 determines a final adjusted resolution based on the received expected adjusted resolution and the resolution set supported by the UE2.

The IMS-AGW1 determines, based on the expected adjusted resolution sent by the base station, whether the expected adjusted resolution belongs to the resolution supported by the UE2. If the expected adjusted resolution belongs to the resolution supported by the UE2, the IMS-AGW1 sends the expected adjusted resolution to the UE1. If the expected adjusted resolution sent by the base station does not belong to the resolution supported by the UE2, the IMS-AGW1 selects downwards, in the resolution set supported by the UE2, a final adjusted resolution corresponding to the expected adjusted resolution of the eNB1. For example, the resolution set supported by the UE2 is {360, 720, 1080}, while the expected adjusted resolution of the eNB1 is 540. Because only 360 is less than 540, the final adjusted resolution determined by the IMS-AGW1 is 360.

510: The IMS-AGW1 notifies the UE1 to send a video packet based on the final adjusted resolution.

511: The UE1 sends the video packet based on the final adjusted resolution.

A resolution of an uplink media stream is reduced, and a bandwidth occupied by the uplink media stream is reduced.

512: After receiving the video packet, the IMS-AGW1 sends the video packet to the IMS-AGW2.

The IMS-AGW1 notifies the eNB1 of an adjustment result.

513: After receiving the video packet, the IMS-AGW2 sends a request to the eNB2 to obtain a target resolution.

The IMS-AGW2 queries the eNB2 about whether an uplink network resource can support a higher resolution. The higher resolution is relative to the current resolution, such as the resolution 360 in step 509.

514: The eNB2 determines an expected resolution based on wireless channel quality and a radio resource, and sends the expected resolution to the IMS-AGW2.

515: The IMS-AGW2 receives the expected resolution, determines a super-resolution target resolution based on the resolution set supported by the UE2, and performs super-resolution.

The IMS-AGW2 determines whether the expected resolution is in the resolution set supported by the UE2, and if the expected resolution is a resolution supported by the UE2, uses the expected resolution as the super-resolution target resolution to perform super-resolution: or if the expected resolution is not a resolution supported by the UE2, selects downwards, in the resolution set supported by the UE2, a final adjusted resolution corresponding to the expected adjusted resolution of the eNB2, and uses the final adjusted resolution as the super-resolution target resolution to perform super-resolution.

That is, when the IMS-AGW2 has the super-resolution capability and the peer terminal UE2 does not have the super-resolution capability, the IMS-AGW2 performs super-resolution.

In this case, a resolution of an uplink media stream is increased through super-resolution.

In this embodiment, when the peer media gateway, that is, the IMS-AGW2, has the super-resolution capability and the peer terminal UE2 does not have the super-resolution capability, in this case, regardless of whether the IMS-AGW1 has the super-resolution capability, the IMS-AGW2 performs super-resolution. Certainly, when the IMS-AGW1 also has the super-resolution capability, the IMS-AGW1 may perform super-resolution. This is not specifically limited herein.

Figure 6A:
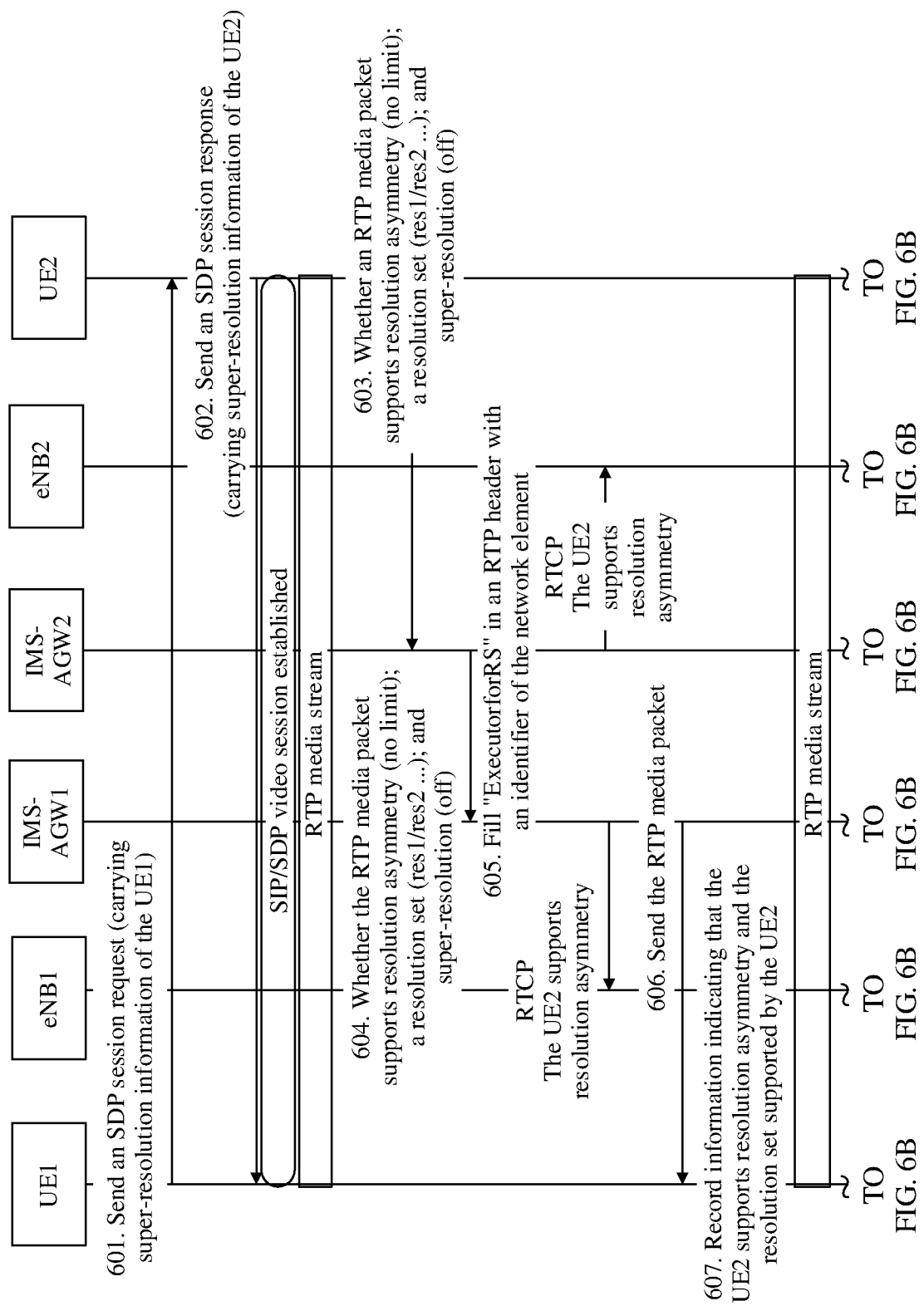
FIG. 6A and FIG. 6B are a schematic flowchart of another video transmission method according to an embodiment of the present disclosure.
Figure 6B:
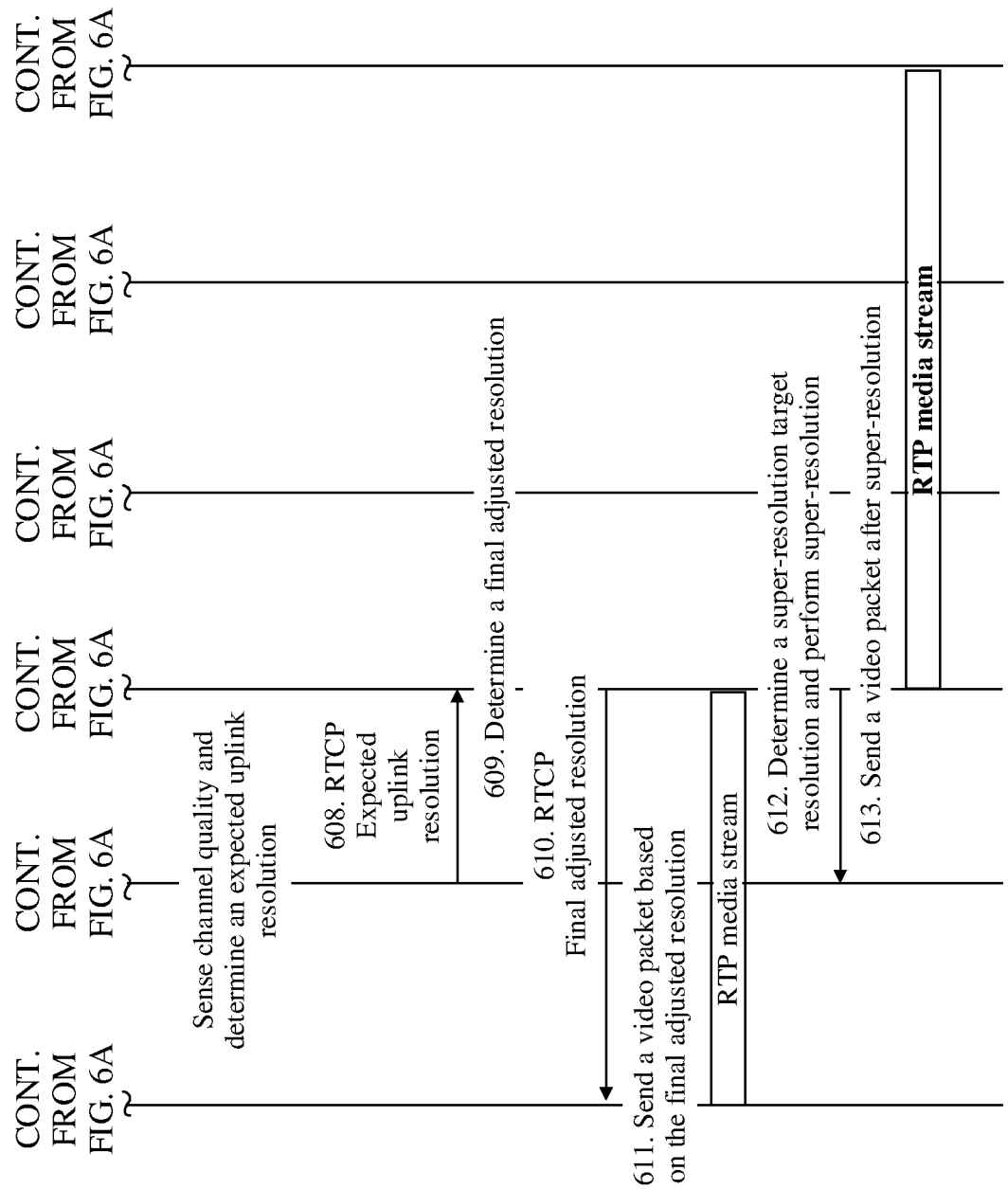

In another implementation, FIG. 6A and FIG. 6B are a schematic flowchart of a video transmission method according to an embodiment of the present disclosure. The method includes steps 601 to 613, which are specifically as follows.

601: A user terminal UE1 sends an SDP session request to a user terminal UE2.

The SDP session request carries super-resolution information of the user terminal UE1.

602: After receiving the SDP session request, the user terminal UE2 sends an SDP session response to the user terminal UE1.

After receiving the SDP session request, the user terminal UE2 identifies a video call initiated by the UE1, and adds super-resolution information of the UE2 to the SDP session response. The super-resolution information is located in a=extmap of SDP, which carries RTP header extension information.

In this case, an SIP/SDP video session is established, and bi-directional media stream sending may be performed.

603: After the session is established, the UE2 sends a packet to an IMS-AGW2, where the packet carries super-resolution capability indication information of the UE2 and resolutions supported by the UE2.

After the session is established, in an RTP media stream initiated by the UE2, an RTP packet header extension carries a resolution set supported by the UE2 and information indicating that the UE2 does not support video super-resolution.

Further, the packet may further carry asymmetry capability information of the UE2. The asymmetry capability information is used to indicate that the UE2 supports asymmetric resolutions in a sending direction and a receiving direction.

604: The IMS-AGW2 parses the packet, stores the resolutions supported by the UE2, and transparently transmits the packet to an IMS-AGW1 when identifying that the UE2 does not have a super-resolution capability and the IMS-AGW2 does not have the super-resolution capability.

The IMS-AGW2 identifies the RTP header extension information, identifies that the UE2 supports asymmetric resolutions, that is, changing a resolution in a single direction is possible, stores the resolution set supported by the UE2, and identifies, based on a parameter "SuperResInd" in the RTP header extension information, that the UE2 does not support video super-resolution. If the IMS-AGW2 also does not support super-resolution, the IMS-AGW2 directly forwards the packet.

In addition, the IMS-AGW2 notifies an eNB2 that the UE2 supports resolution asymmetry, to indicate that the UE2 supports unidirectional resolution adjustment.

If the IMS-AGW2 supports super-resolution, the video super-resolution capability in the RTP header extension is changed to On, that is, a front end is indicated that a back end performs super-resolution. The IMS-AGW2 may further add an identifier of the IMS-AGW2 to indicate a device that is to perform super-resolution, which may be in another form. This solution is not specifically limited.

Further, if the UE2 does not support resolution asymmetry, during resolution adjustment based on a resource, resolutions in the receiving direction and the sending direction can be simultaneously adjusted.

605: If the IMS-AGW1 identifies that the back end does not have the super-resolution capability, the IMS-AGW1 fills "ExecutorforRS" in the RTP header extension with a network element identifier of the IMS-AGW1, that is, the IMS-AGW1 can perform super-resolution processing on a future received video stream from the UE1 and sends the video stream to the IMS-AGW2, and the IMS-AGW1 stores the resolution set supported by the UE2.

The IMS-AGW1 further notifies an eNB1 that the UE2 supports asymmetric uplink and downlink resolutions, that is, indicates that the UE2 supports unidirectional resolution adjustment.

606: The IMS-AGW1 forwards the RTP header extension information to the UE1, where the information carries information indicating that the UE2 supports asymmetric resolutions, the resolution set supported by the UE2, and the "identifier of the network element or the terminal that performs super-resolution".

607: The UE1 records the information indicating that the UE2 supports resolution asymmetry and the resolution set supported by the UE2.

In this process, bidirectional media streams are still being continuously sent.

When the eNB1 senses a change in channel quality or a radio resource, that is, a change in uplink channel quality or an uplink radio resource, the eNB1 determines, based on a current resource, a resolution that can be supported by the eNB1.

If both uplink and downlink resources deteriorate and the UE2 supports resolution asymmetry, the eNB1 may determine corresponding uplink and downlink adjusted target resolutions based on the uplink and downlink resources, respectively. If both uplink and downlink resources deteriorate and the UE2 does not support resolution asymmetry, the eNB1 may determine uniform uplink and downlink target resolutions based on a worst resource in the uplink and downlink resources.

608: The eNB1 notifies the IMS-AGW1 of an expected adjusted resolution of the eNB1.

609: The IMS-AGW1 determines a final adjusted resolution based on the received expected adjusted resolution and the resolution set supported by the UE2.

The IMS-AGW1 determines, based on the expected adjusted resolution sent by the base station, whether the expected adjusted resolution belongs to the resolution supported by the UE2. If the expected adjusted resolution belongs to the resolution supported by the UE2, the IMS-AGW1 sends the expected adjusted resolution to the UE1. If the expected adjusted resolution sent by the base station does not belong to the resolution supported by the UE2, the IMS-AGW1 selects downwards, in the resolution set supported by the UE2, a final adjusted resolution corresponding to the expected adjusted resolution of the eNB1. For example, the resolution set supported by the UE2 is {360, 720, 1080}, while the expected adjusted resolution of the eNB1 is 540. Because only 360 is less than 540, the final adjusted resolution determined by the IMS-AGW1 is 360.

610: The IMS-AGW1 notifies the UE1 to send a video packet based on the final adjusted resolution.

611: The UE1 sends the video packet based on the final adjusted resolution.

A resolution of an uplink media stream is reduced, and a bandwidth occupied by the uplink media stream is reduced.

612: After receiving the video packet, the IMS-AGW1 determines a target resolution based on the resolution set supported by the UE2, and performs super-resolution.

The IMS-AGW1 notifies the eNB1 of an adjustment result. The IMS-AGW1 determines a super-resolution target resolution based on the resolution set supported by the UE2, and performs super-resolution. The target resolution is higher than the resolution of the video packet sent by the UE1.

When the IMS-AGW1 has the super-resolution capability and neither the terminal UE2 nor the IMS-AGW2 has the super-resolution capability, the IMS-AGW1 performs super-resolution.

In this case, a resolution of an uplink media stream is increased through super-resolution.

613: The IMS-AGW1 sends the video packet after super-resolution to the IMS-AGW2, so that the IMS-AGW2 forwards the video packet to the UE2 for playback.

In this embodiment, when neither the terminal UE2 nor the IMS-AGW2 has the super-resolution capability, and the IMS-AGW1 has the super-resolution capability, the IMS-AGW1 performs super-resolution.

Figure 7A:
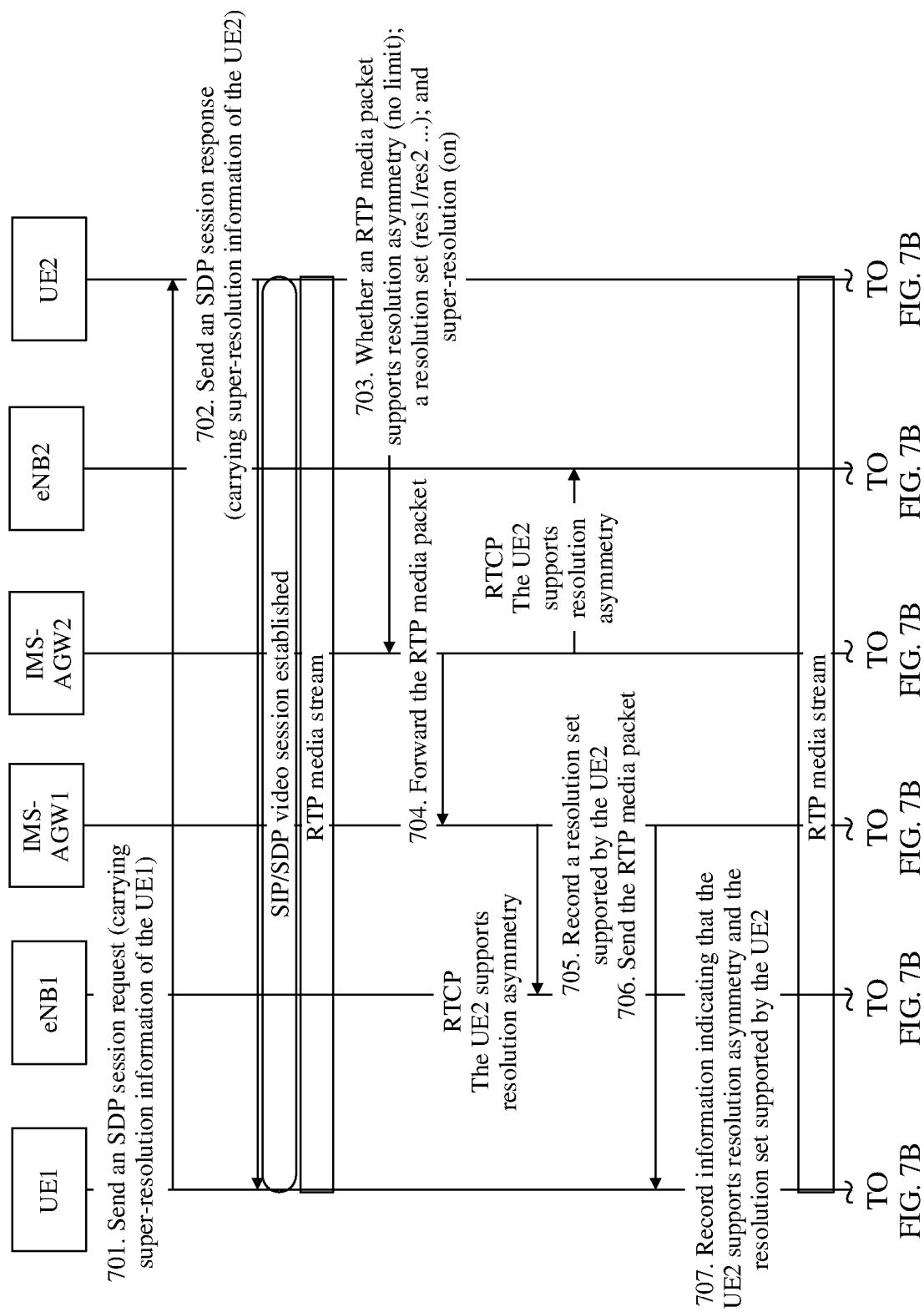
FIG. 7A and FIG. 7B are a schematic flowchart of still another video transmission method according to an embodiment of the present disclosure.
Figure 7B:
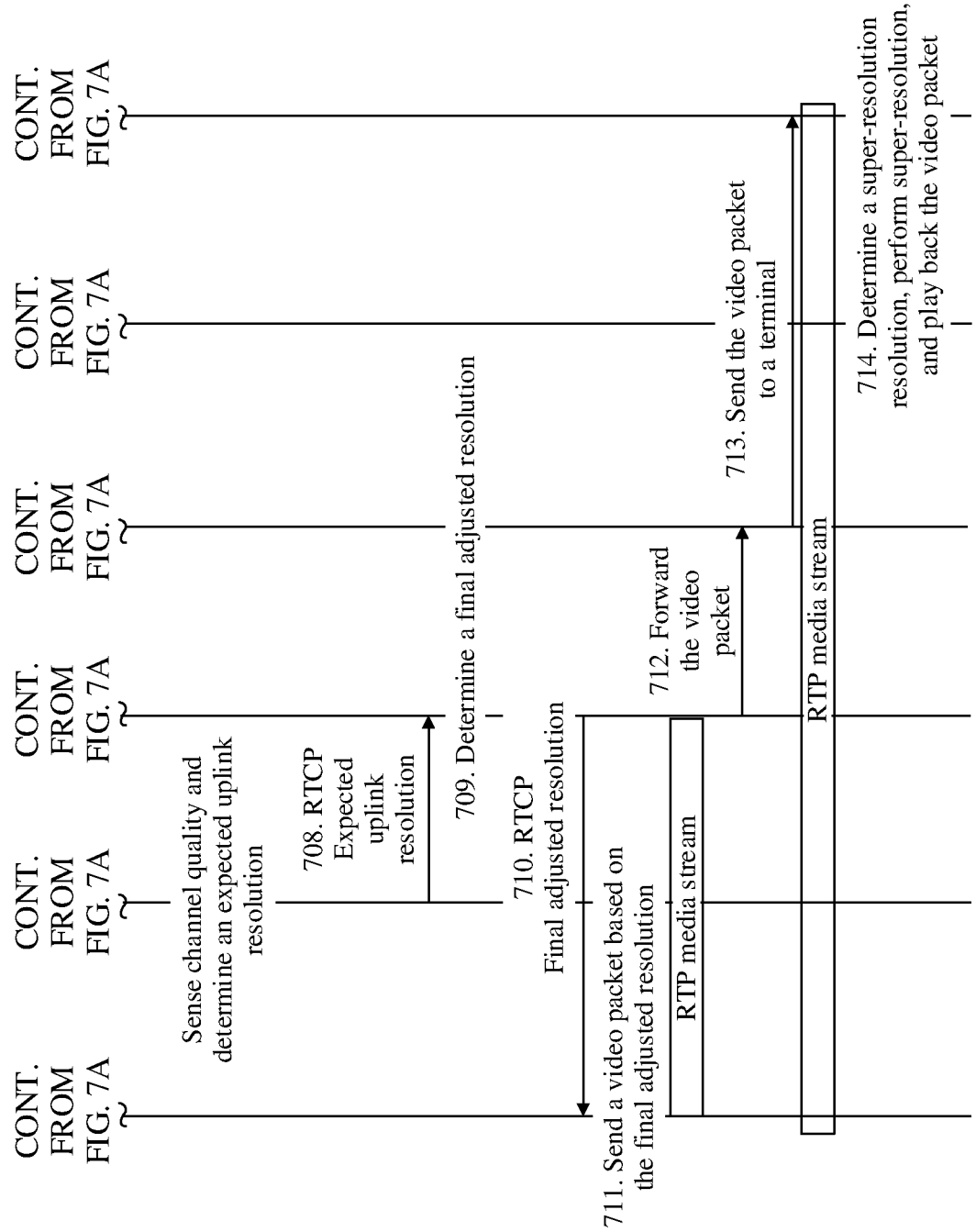

In still another implementation, FIG. 7A and FIG. 7B are a schematic flowchart of a video transmission method according to an embodiment of the present disclosure. The method includes steps 701 to 714, which are specifically as follows.

701: A user terminal UE1 sends an SDP session request to a user terminal UE2.

The SDP session request carries super-resolution information of the user terminal UE1.

702: After receiving the SDP session request, the user terminal UE2 sends an SDP session response to the user terminal UE1.

After receiving the SDP session request, the user terminal UE2 identifies a video call initiated by the UE1, and adds super-resolution information of the UE2 to the SDP session response. The super-resolution information is located in a=extmap of SDP, which carries RTP header extension information.

In this case, an SIP/SDP video session is established, and bi-directional media stream sending may be performed.

703: After the session is established, the UE2 sends a packet to an IMS-AGW2, where the packet carries super-resolution capability indication information of the UE2 and resolutions supported by the UE2.

After the session is established, in an RTP media stream initiated by the UE2, an RTP packet header extension carries a resolution set supported by the UE2 and information indicating that the UE2 supports video super-resolution.

Further, the packet may further carry asymmetry capability information of the UE2. The asymmetry capability information is used to indicate that the UE2 supports asymmetric resolutions in a sending direction and a receiving direction.

704: The IMS-AGW2 parses the packet, stores the resolutions supported by the UE2, and transparently transmits the packet to an IMS-AGW1 after identifying that the UE2 has a super-resolution capability.

The IMS-AGW2 identifies the RTP header extension information, identifies that the UE2 supports asymmetric resolutions, that is, changing a resolution in a single direction is possible, and stores the resolution set supported by the UE2. After it is identified that the UE2 has the super-resolution capability, the UE2 performs super-resolution regardless of whether the IMS-AGW2 supports super-resolution. Therefore, it is not necessary to carry the parameter "carrying a network element that performs super-resolution".

The IMS-AGW2 forwards the RTP header extension information to the IMS-AGW1, which carries RTP header extension information, that is, information indicating that the UE2 "terminal supports asymmetric uplink and downlink resolutions", "the resolution set supported by the terminal" UE2, and information indicating that the UE2 "terminal supports the video super-resolution capability".

In addition, the IMS-AGW2 notifies an eNB2 that the UE2 supports resolution asymmetry, to indicate that the UE2 supports unidirectional resolution adjustment.

Further, if the UE2 does not support resolution asymmetry, during resolution adjustment based on a resource, resolutions in the receiving direction and the sending direction can be simultaneously adjusted.

705: The IMS-AGW1 identifies that the UE2 has the super-resolution capability. Regardless of whether the IMS-AGW1 supports super-resolution, the IMS-AGW1 does not need to carry a parameter "carrying a network element that performs super-resolution", and the IMS-AGW1 stores the resolution set supported by the UE2.

The IMS-AGW1 further notifies an eNB1 that the UE2 supports asymmetric uplink and downlink resolutions, that is, indicates that the UE2 supports unidirectional resolution adjustment.

706: The IMS-AGW1 forwards the RTP header extension information to the UE1, where the information carries information indicating that the UE2 supports asymmetric resolutions, the resolution set supported by the UE2, and information indicating that the UE2 "terminal supports the video super-resolution capability".

707: The UE1 records the information indicating that the UE2 supports resolution asymmetry and the resolution set supported by the UE2.

In this process, bidirectional media streams are still being continuously sent.

When the eNB1 senses a change in channel quality or a radio resource, that is, a change in uplink channel quality or an uplink radio resource, the eNB1 determines, based on a current resource, a resolution that can be supported by the eNB1.

If both uplink and downlink resources deteriorate and the UE2 supports resolution asymmetry, the eNB1 may determine corresponding uplink and downlink adjusted target resolutions based on the uplink and downlink resources, respectively. If both uplink and downlink resources deteriorate and the UE2 does not support resolution asymmetry, the eNB1 may determine uniform uplink and downlink target resolutions based on a worst resource in the uplink and downlink resources.

708: The eNB1 notifies the IMS-AGW1 of an expected adjusted resolution of the eNB1.

709: The IMS-AGW1 determines a final adjusted resolution based on the received expected adjusted resolution and the resolution set supported by the UE2.

The IMS-AGW1 determines, based on the expected adjusted resolution sent by the base station, whether the expected adjusted resolution belongs to the resolution supported by the UE2. If the expected adjusted resolution belongs to the resolution supported by the UE2, the IMS-AGW1 sends the expected adjusted resolution to the UE1. If the expected adjusted resolution sent by the base station does not belong to the resolution supported by the UE2, the IMS-AGW1 selects downwards, in the resolution set supported by the UE2, a final adjusted resolution corresponding to the expected adjusted resolution of the eNB1. For example, the resolution set supported by the UE2 is {360, 720, 1080}, while the expected adjusted resolution of the eNB1 is 540. Because only 360 is less than 540, the final adjusted resolution determined by the IMS-AGW1 is 360.

710: The IMS-AGW1 notifies the UE1 to send a video packet based on the final adjusted resolution.

711: The UE1 sends the video packet based on the final adjusted resolution.

A resolution of an uplink media stream is reduced, and a bandwidth occupied by the uplink media stream is reduced.

712: After receiving the video packet, the IMS-AGW1 sends the video packet to the IMS-AGW2.

The IMS-AGW1 notifies the eNB1 of an adjustment result.

713: After receiving the video packet, the IMS-AGW2 forwards the video packet to the UE2.

714: After receiving the video packet, the UE2 determines a super-resolution target resolution based on the resolution set supported by the UE2, and performs super-resolution and plays back the video packet.

The UE2 determines the super-resolution target resolution based on a capability of the UE2, and then performs super-resolution.

In this case, a resolution of an uplink media stream is increased through super-resolution.

In this embodiment, when the terminal UE2 has the super-resolution capability, regardless of whether the IMS-AGW1 and the IMS-AGW2 have the super-resolution capability, the UE2 performs super-resolution. Certainly, when the IMS-AGW1 and the IMS-AGW2 also have the super-resolution capability, any one of the IMS-AGW1 and the IMS-AGW2 may perform super-resolution. This is not specifically limited herein.

In the foregoing embodiments, only the example in which the UE1 sends the video is used to describe a process of adopting super-resolution on a one-way video from the UE1 to the UE2. For a process of adopting super-resolution in a direction in which the UE2 sends a video to the UE1, refer to the foregoing content. Details are not described herein again.

Figure 8:
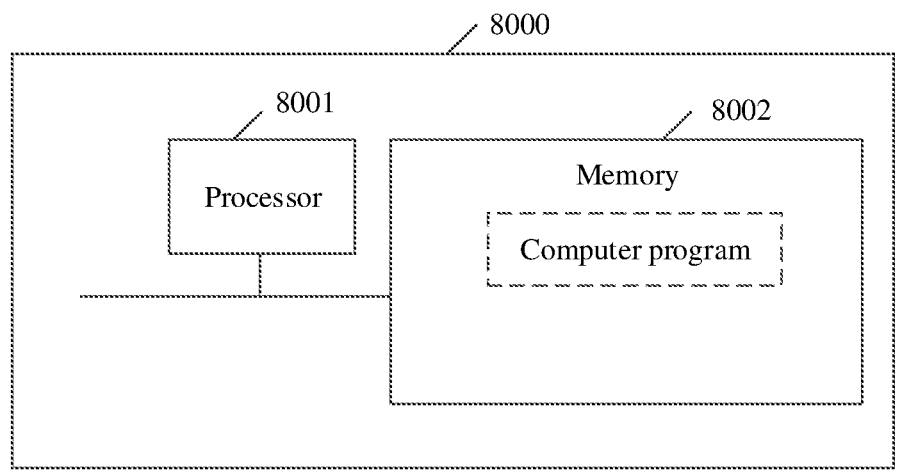
FIG. 8 is a schematic diagram of a structure of a video transmission device according to an embodiment of the present disclosure.

FIG. 8 is a schematic diagram of a structure of a video transmission device 8000 according to an embodiment of the present disclosure. As shown in FIG. 8, the video transmission device 8000 includes a processor 8001 and a memory 8002 that are mutually coupled. The memory 8002 stores computer program code. The processor 8001 invokes and executes the computer program code in the memory 8002, so that the video transmission device 8000 performs the video transmission method provided in the foregoing embodiment. The video transmission device may be a media gateway, an access gateway, a multimedia resource function device, or an SBC.

Specifically, the video transmission device 8000 may be configured to:

receive an uplink media packet sent by a first terminal, where the uplink media packet carries information indicating that the first terminal supports an uplink-downlink resolution asymmetry capability and an uplink media stream of a first resolution of the first terminal; and send a first downlink media packet to the first terminal, where the first downlink media packet carries a downlink media stream of a second resolution of the first terminal, and the first resolution is different from the second resolution.

The video transmission device 8000 is further configured to receive a second downlink media packet sent by a second media gateway, where the second downlink media packet carries a downlink media stream of a third resolution; and perform super-resolution processing on the downlink media stream of the third resolution to obtain the downlink media stream of the second resolution.

The video transmission device 8000 is further configured to receive the first downlink media packet sent by a second media gateway.

Further, the video transmission device 8000 is further configured to: receive a second downlink media packet sent by a second terminal, where the second downlink media packet carries a downlink media stream of a third resolution:

perform super-resolution processing on the downlink media stream of the third resolution to obtain the downlink media stream of the second resolution; and send the downlink media stream of the second resolution to the first media gateway by using the first downlink media packet.

Figure 9:
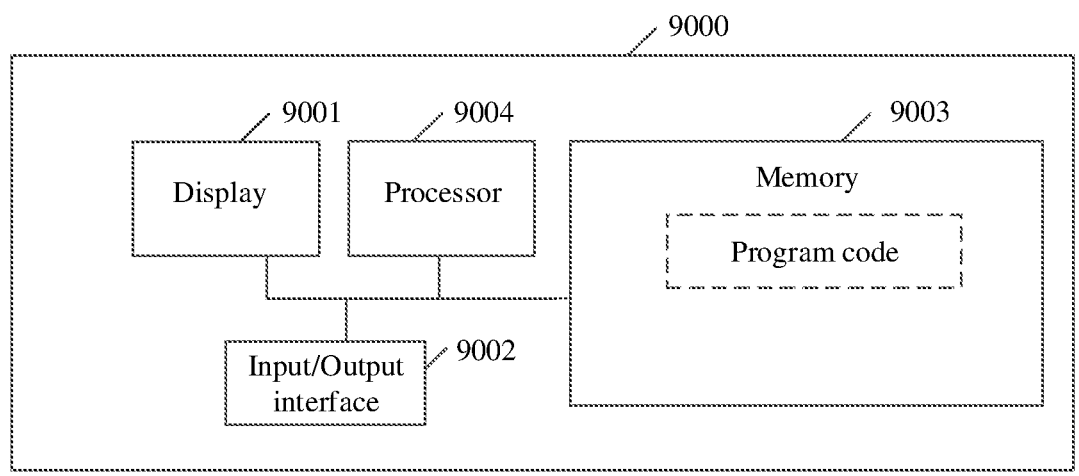
FIG. 9 is a schematic diagram of a structure of a terminal according to an embodiment of the present disclosure.

FIG. 9 is a schematic diagram of a structure of a terminal according to an embodiment of the present disclosure. As shown in FIG. 9, the terminal 9000 includes a display 9001, an input/output interface 9002, a memory 9003 and a processor 9004 that are mutually coupled. The memory 9003 stores computer program code. The processor 9004 invokes and executes the computer program code in the memory 9003, so that the terminal 9000 performs the video transmission method.

Specifically, the terminal 9000 may be configured to:

send an uplink media packet to a media gateway, where the uplink media packet carries a resolution that is of a downlink media stream and that is supported by the terminal and an uplink media stream of the terminal; and receive a downlink media packet sent by the media gateway, where a resolution of a downlink media stream carried in the downlink media packet is the resolution supported by the terminal.

The terminal 9000 is further configured to: perform super-resolution on a received downlink media stream, and play back the downlink media stream.

The terminal 9000 is further configured to: send a media session request to the media gateway, to request to establish a media session with a second terminal; and send the uplink media packet to the media gateway after establishing the media session with the second terminal.

Further, the terminal 9000 is further configured to: receive a media session request of a second terminal sent by the media gateway, where the media session request is used to request to establish a media session with the terminal:

send a media session response to the media gateway, to establish the media session with the second terminal; and send the uplink media packet to the media gateway after establishing the media session with the second terminal.

An embodiment of the present disclosure further provides a computer readable storage medium. The computer readable storage medium stores instructions. When the instructions run on a computer or a processor, the computer or the processor performs one or more steps in any one of the foregoing methods.

An embodiment of the present disclosure further provides a computer program product that includes instructions. When the computer program product runs on a computer or a processor, the computer or the processor performs one or more steps of any one of the foregoing methods.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, the procedures or functions according to embodiments of the present disclosure are all or partially generated. The computer may be a general-purpose computer, a dedicated computer, a computer network, or another programmable apparatus. The computer instructions may be stored in a computer-readable storage medium or may be transmitted by using the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person of ordinary skill in the art may understand that all or some procedures in the embodiment methods may be implemented by a computer program instructing related hardware. The program may be stored in a computer-readable storage medium. When the program is executed, the procedures in the method embodiments may be included. The foregoing storage medium includes any medium that can store program code, such as a ROM, a random access memory RAM, a magnetic disk, or an optical disc. The foregoing descriptions are merely specific implementations of embodiments of the present disclosure, but are not intended to limit the protection scope of embodiments of the present disclosure. Any variation or replacement within the technical scope disclosed in embodiments of the present disclosure shall fall within the protection scope of embodiments of the present disclosure. Therefore, the protection scope of embodiments of the present disclosure shall be subject to the protection scope of the claims.

What is claimed is:

1. A video transmission method, comprising:
receiving, by a first media gateway, an uplink media packet from a first terminal, wherein the uplink media packet carries information indicating that the first terminal supports an uplink-downlink resolution asymmetry capability and an uplink media stream of a first resolution of the first terminal, and the uplink-downlink resolution asymmetry capability allows different resolutions in a sending direction and a receiving direction; and
sending, by the first media gateway, a first downlink media packet to the first terminal, wherein the first downlink media packet carries a downlink media stream of a second resolution of the first terminal, and the first resolution is different from the second resolution,
wherein the uplink-downlink resolution asymmetry capability supports different resolutions for a downlink media stream carried in a downlink media packet transmitted from the first media gateway to the first terminal and an uplink media stream carried in an uplink media packet transmitted from the first terminal to the first media gateway, and supports unidirectional resolution adjustment for adjusting resolutions in the receiving direction and the sending direction asynchronously.

2. The method according to claim 1, further comprising:
receiving, by the first media gateway, a second downlink media packet from a second media gateway, wherein the second downlink media packet carries a downlink media stream of a third resolution; and
performing, by the first media gateway, super-resolution processing on the downlink media stream of the third resolution to obtain the downlink media stream of the second resolution, wherein the second resolution is higher than the third resolution.

3. The method according to claim 1, further comprising:
receiving, by the first media gateway, the first downlink media packet sent by a second media gateway.

4. The method according to claim 1, further comprising:
receiving, by a second media gateway, a second downlink media packet from a second terminal, wherein the second downlink media packet carries a downlink media stream of a third resolution;
performing, by the second media gateway, super-resolution processing on the downlink media stream of the third resolution to obtain the downlink media stream of the second resolution, wherein the second resolution is higher than the third resolution; and
sending, by the second media gateway, the downlink media stream of the second resolution to the first media gateway by using the first downlink media packet.

5. A video transmission method, comprising:
sending, by a first terminal, an uplink media packet to a media gateway, wherein the uplink media packet carries a resolution that is of a downlink media stream and that is supported by the first terminal and an uplink media stream of the first terminal, and the uplink media packet carries capability information indicating that the first terminal supports an uplink-downlink resolution asymmetry capability that allows different resolutions in a sending direction and a receiving direction; and
receiving, by the first terminal, a downlink media packet from the media gateway, wherein a resolution of a downlink media stream carried in the downlink media packet is the resolution supported by the first terminal,
wherein the uplink-downlink resolution asymmetry capability supports different resolutions for a downlink media stream carried in a downlink media packet transmitted from the media gateway to the first terminal and an uplink media stream carried in an uplink media packet transmitted from the first terminal to the media gateway, and supports unidirectional resolution adjustment for adjusting resolutions in the receiving direction and the sending direction asynchronously.

6. The method according to claim 5, further comprising:
performing, by the first terminal, super-resolution on the received downlink media stream to enhance the resolution of the downlink media stream, and playing the downlink media stream.

7. The method according to claim 5, wherein the uplink media packet is a real-time transport protocol (RTP) packet.

8. The method according to claim 7, wherein the resolution that is of the downlink media stream and that is supported by the first terminal is carried in a header of the RTP packet.

9. The method according to claim 7, wherein the capability information is carried in a header of the RTP packet.

10. The method according to claim 5, further comprising:
sending, by the first terminal, a media session request to the media gateway, to request to establish a media session with a second terminal; and
sending, by the first terminal, the uplink media packet to the media gateway after establishing the media session with the second terminal.

11. The method according to claim 5, further comprising:
receiving, by the first terminal, a media session request of a second terminal from the media gateway, wherein the media session request requests to establish a media session with the first terminal;
sending, by the first terminal, a media session response to the media gateway, to establish the media session with the second terminal; and
sending, by the first terminal, the uplink media packet to the media gateway after establishing the media session with the second terminal.

12. The method according to claim 10, wherein the media session request is a session description protocol (SDP) session request.

13. The method according to claim 11, wherein the media session response carries indication information indicating that the first terminal supports a super-resolution capability allowing the first terminal to enhance a resolution of a media steam.

14. A communication apparatus, comprising at least one processor and a memory storing instructions that, when executed by the at least one processor, cause the communication apparatus to perform operations comprising:
receiving an uplink media packet from a terminal, wherein the uplink media packet carries information indicating that the terminal supports an uplink-downlink resolution asymmetry capability and an uplink media stream of a first resolution of the terminal, and the uplink-downlink resolution asymmetry capability allows different resolutions in a sending direction and a receiving direction; and
sending a first downlink media packet to the terminal, wherein the first downlink media packet carries a downlink media stream of a second resolution of the terminal, and the first resolution is different from the second resolution, wherein the uplink-downlink resolution asymmetry capability supports different resolutions for a downlink media stream carried in a downlink media packet transmitted from the communication apparatus to the terminal and an uplink media stream carried in an uplink media packet transmitted from the terminal to the communication apparatus, and supports unidirectional resolution adjustment for adjusting resolutions in the receiving direction and the sending direction asynchronously.

15. The communication apparatus according to claim 14, wherein the operations further comprise:

receiving a second downlink media packet sent by a media gateway, wherein the second downlink media packet carries a downlink media stream of a third resolution; and performing super-resolution processing on the downlink media stream of the third resolution to obtain the downlink media stream of the second resolution, wherein the second resolution is higher than the third resolution.

16. The communication apparatus according to claim 14, wherein the operations further comprise:

receiving the first downlink media packet sent by a media gateway.

17. The video transmission method according to claim 7, wherein a header of the RTP packet comprises one or more bits indicating whether the first terminal supports an uplink-downlink resolution asymmetry capability, and one or more bits indicating the resolution that is of the downlink media stream and that is supported by the first terminal.

18. The video transmission method according to claim 17, wherein the header of the RTP packet further comprises one or more bits indicating that the first terminal supports a super-resolution capability allowing the first terminal to enhance a resolution of a media steam.

19. The video transmission method according to claim 18, wherein the header of the RTP packet further comprises an identifier of a network element that performs super-resolution.

20. A communication apparatus, comprising at least one processor and a memory storing instructions that, when executed by the at least one processor, cause the communication apparatus to perform operations comprising:

sending an uplink media packet to a media gateway, wherein the uplink media packet carries a resolution that is of a downlink media stream and that is supported by a first terminal and an uplink media stream of the first terminal, and the uplink media packet carries capability information indicating that the first terminal supports an uplink-downlink resolution asymmetry capability that allows different resolutions in a sending direction and a receiving direction; and receiving a downlink media packet from the media gateway, wherein a resolution of a downlink media stream carried in the downlink media packet is the resolution supported by the first terminal, wherein the uplink-downlink resolution asymmetry capability supports different resolutions for a downlink media stream carried in a downlink media packet transmitted from the media gateway to the first terminal and an uplink media stream carried in an uplink media packet transmitted from the first terminal to the media gateway, and supports unidirectional resolution adjustment for adjusting resolutions in the receiving direction and the sending direction asynchronously.

* * * * *

UNITED STATES PATENT AND TRADEMARK OFFICE
CERTIFICATE OF CORRECTION

| | | |
|---|---|---|
| PATENT NO. | : 12,143,433 B2 | Page 1 of 1 |
| APPLICATION NO. | : 18/150980 | |
| DATED | : November 12, 2024 | |
| INVENTOR(S) | : Yan Liu | |

It is certified that error appears in the above-identified patent and that said Letters Patent is hereby corrected as shown below:

In the Specification

Column 8, Line 39, change "(VOLTE)" to --(VoLTE)--; and

Column 8, Line 40, change "(VONR)" to --(VoNR)--.

Signed and Sealed this
Tenth Day of December, 2024

Katherine Kelly Vidal
*Director of the United States Patent and Trademark Office*